(12) United States Patent
Horst et al.

(10) Patent No.: US 12,449,026 B2
(45) Date of Patent: *Oct. 21, 2025

(54) LARGE SCALE HYDRAULIC CYLINDER ASSEMBLY, DISASSEMBLY AND MAINTENANCE SYSTEM

(71) Applicant: CYLINDER CYCLONE LLC, Harrisonburg, VA (US)

(72) Inventors: Frank L Horst, Harrisonburg, VA (US); David R Horst, Harrisonburg, VA (US); Wayne Sauder, Harrisonburg, VA (US)

(73) Assignee: CYLINDER CYCLONE LLC, Harrisonburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,646

(22) Filed: May 30, 2024

(65) Prior Publication Data
US 2024/0376968 A1 Nov. 14, 2024

Related U.S. Application Data

(63) Continuation of application No. 18/196,728, filed on May 12, 2023, now Pat. No. 12,031,614.

(51) Int. Cl.
*F16H 25/22* (2006.01)
*B23P 19/00* (2006.01)
*F16H 25/20* (2006.01)

(52) U.S. Cl.
CPC .......... *F16H 25/2204* (2013.01); *B23P 19/00* (2013.01); *F16H 2025/2059* (2013.01)

(58) Field of Classification Search
CPC .......... F16H 25/2204; F16H 2025/2059; B23P 19/00; B23P 19/027; B23P 19/04; F15B 15/14; F15B 19/00
See application file for complete search history.

*Primary Examiner* — Lee A Holly
(74) *Attorney, Agent, or Firm* — Stanzione & Associates, PLLC; Patrick Stanzione

(57) ABSTRACT

A large scale hydraulic cylinder assembly, disassembly and maintenance system to hoist a hydraulic cylinder in the air, secure one end of the hydraulic cylinder to a tooling piece secured to a movable hydraulically operated torque head and secure a second end of the hydraulic cylinder to a tooling piece secured to a movable tail stock, and thread or unthread nuts to or from both ends of the hydraulic cylinder under high speed low torque and low speed high torque.

8 Claims, 19 Drawing Sheets

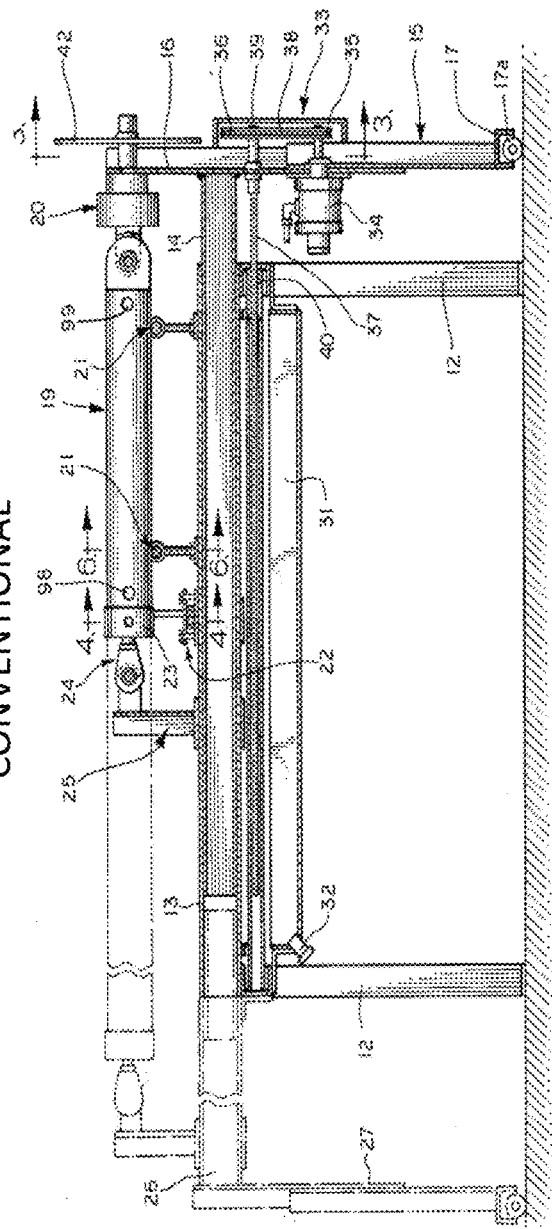
FIG. 1A
CONVENTIONAL
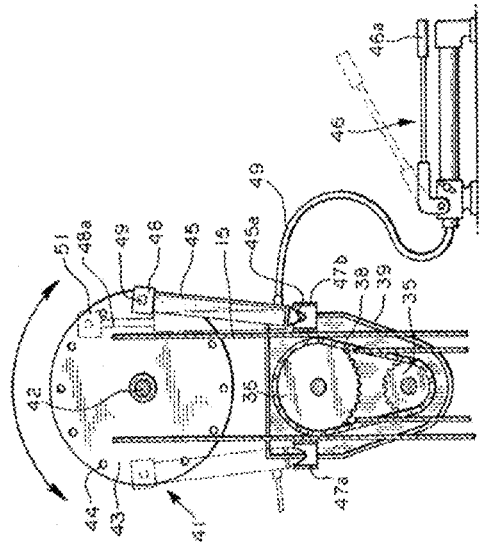
FIG. 1B
CONVENTIONAL

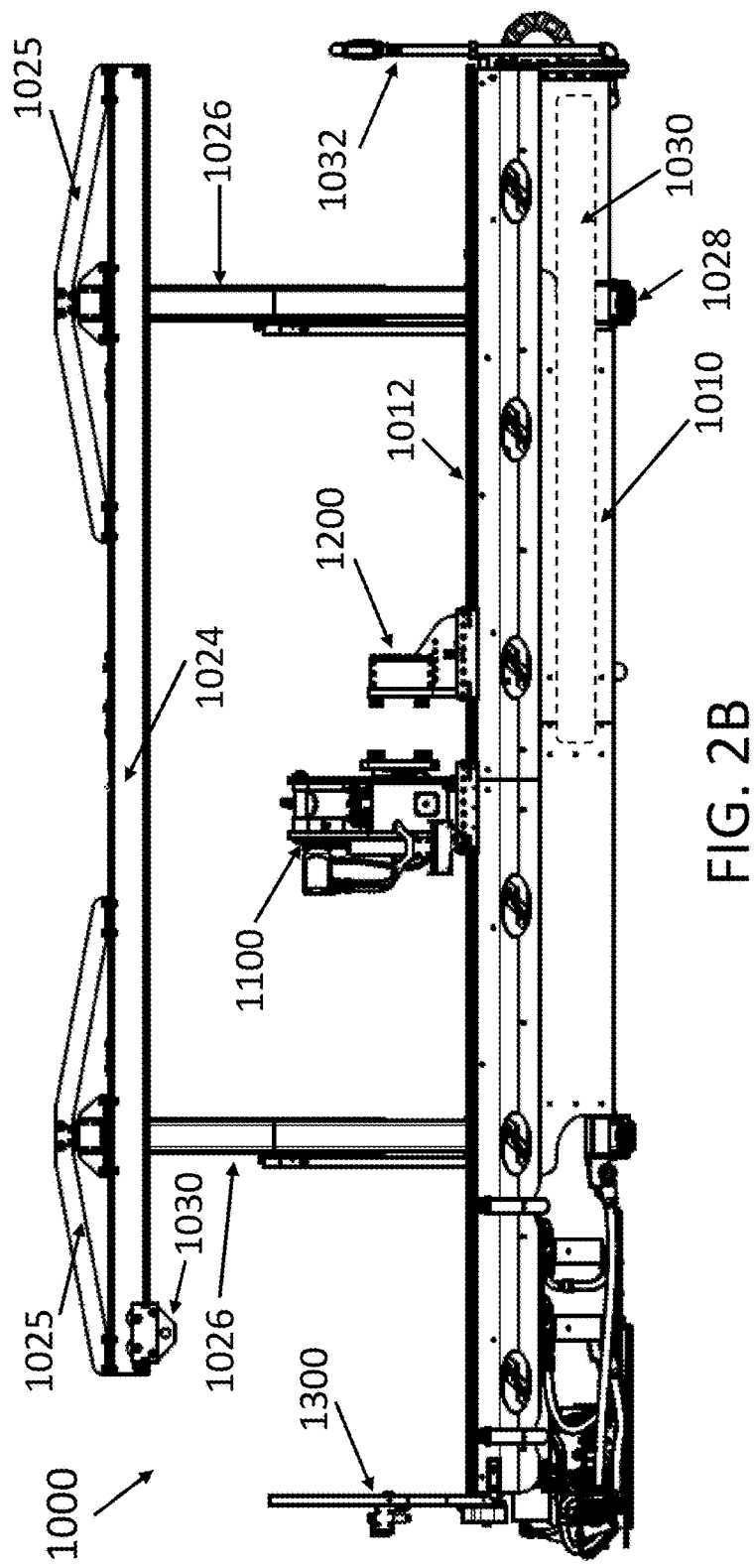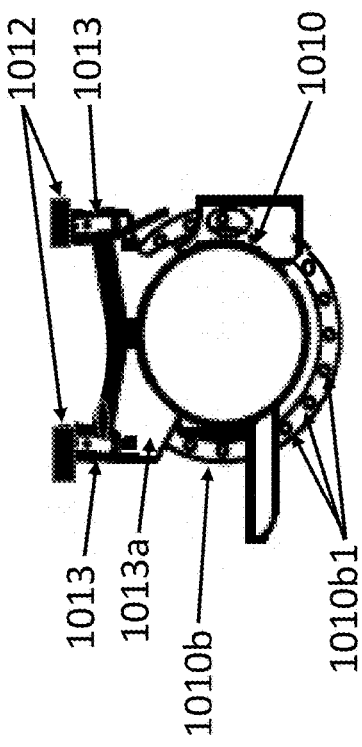

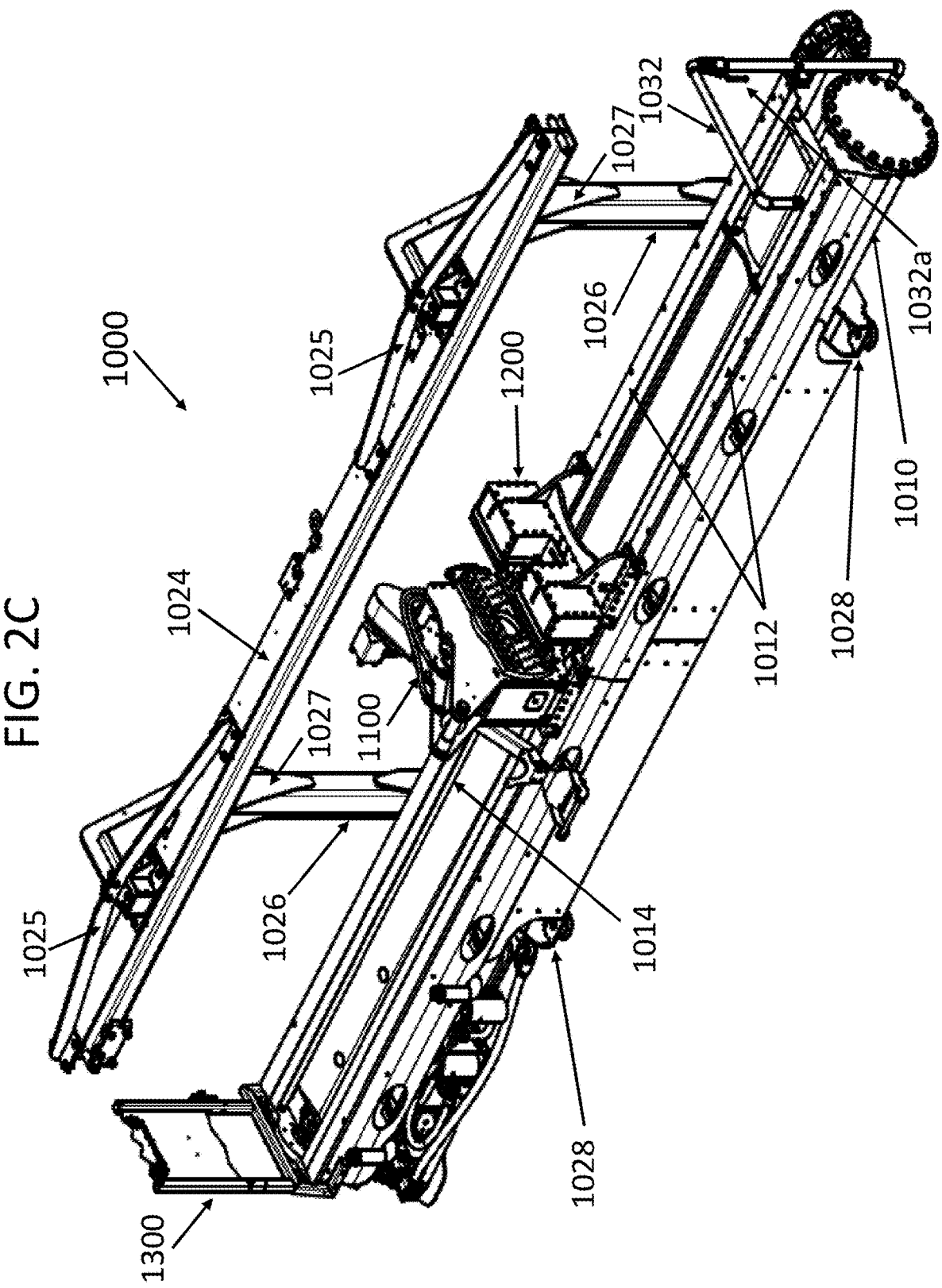

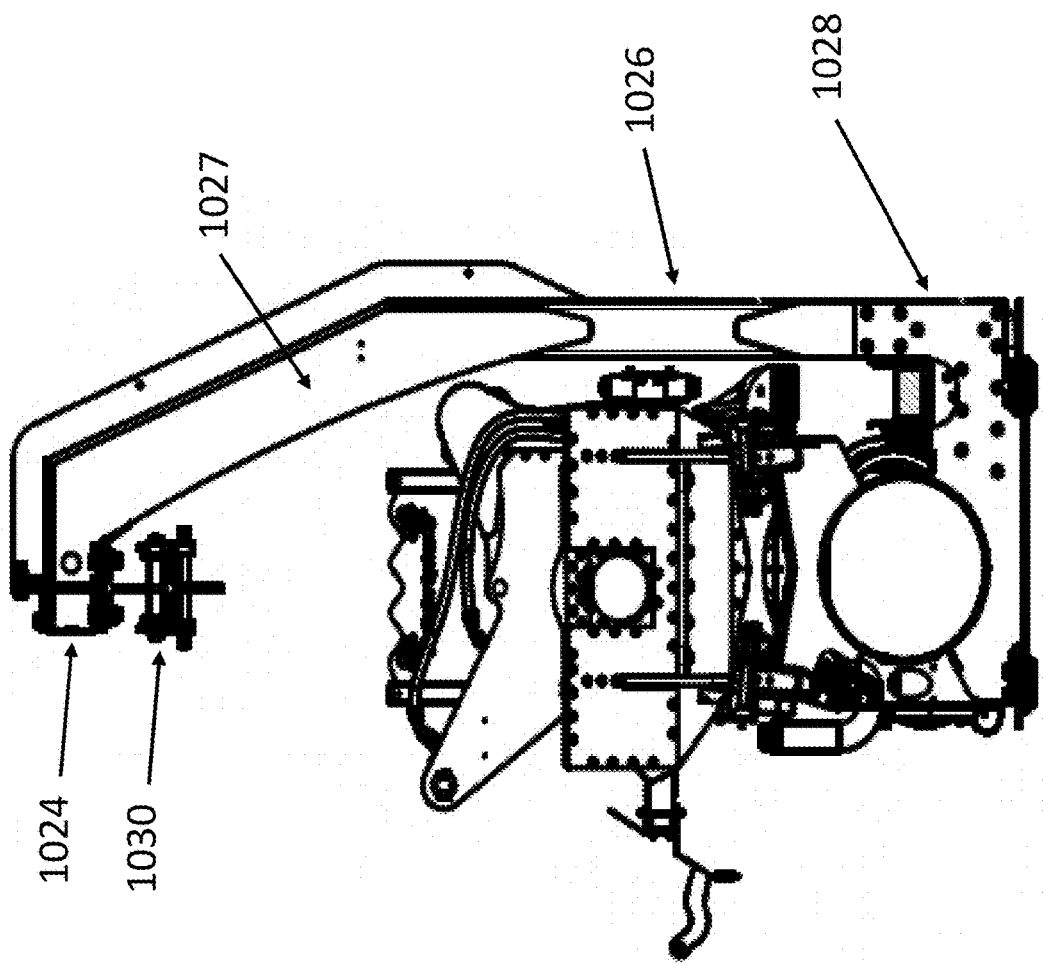

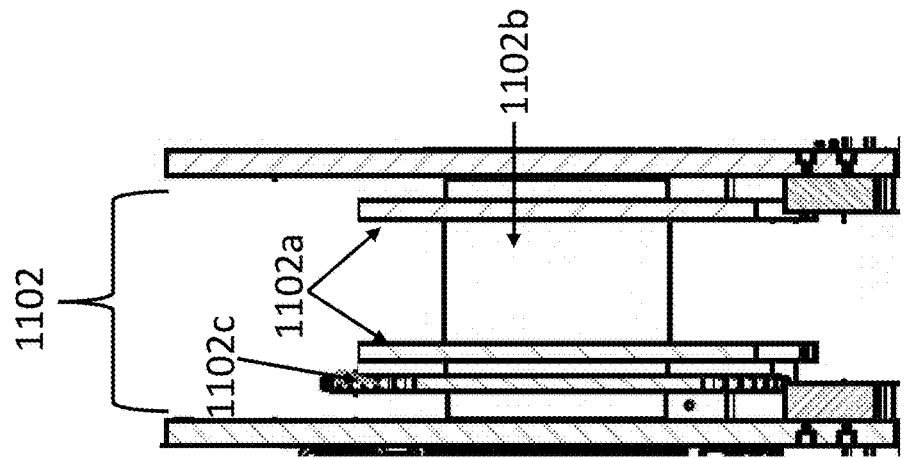
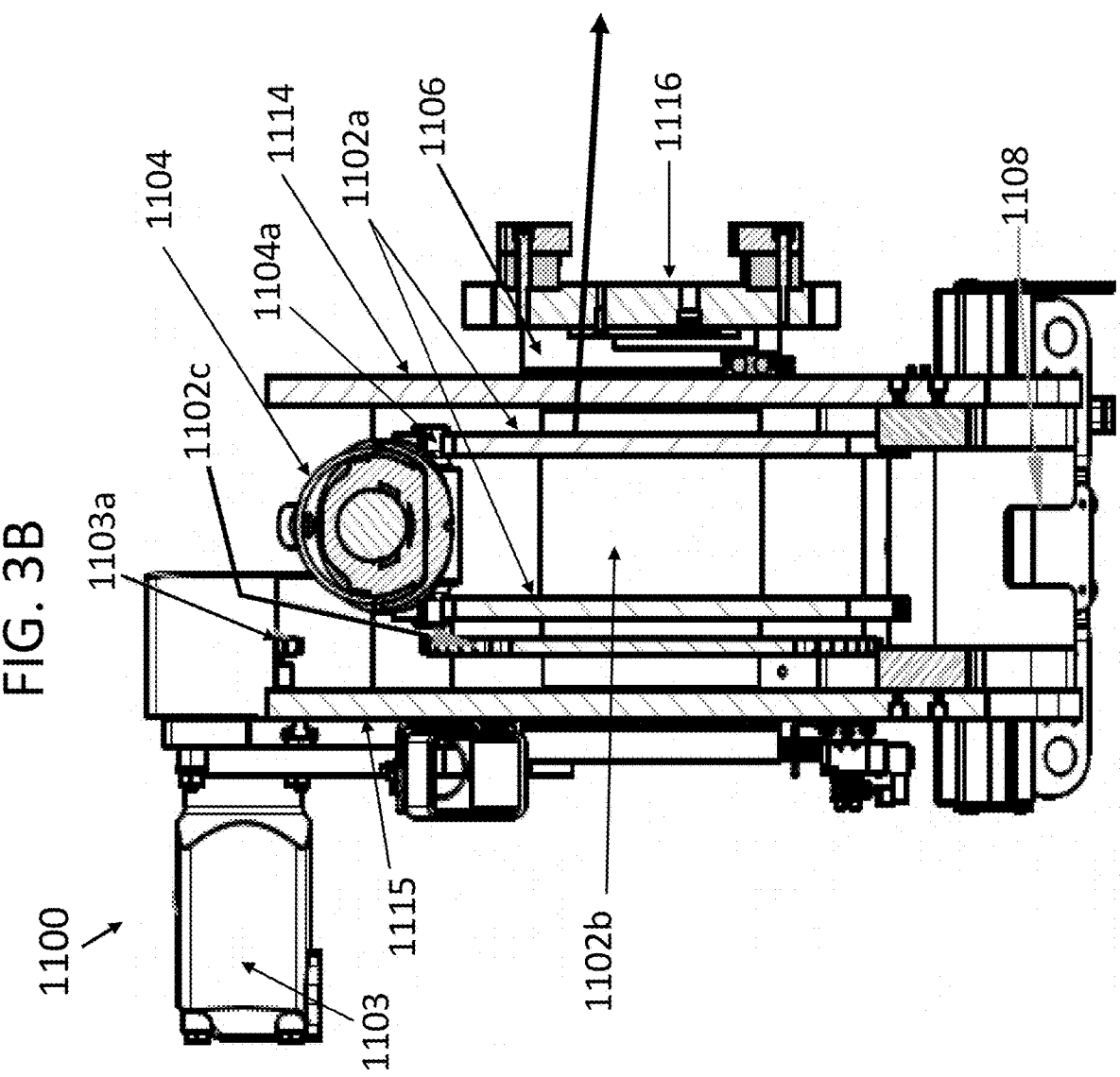

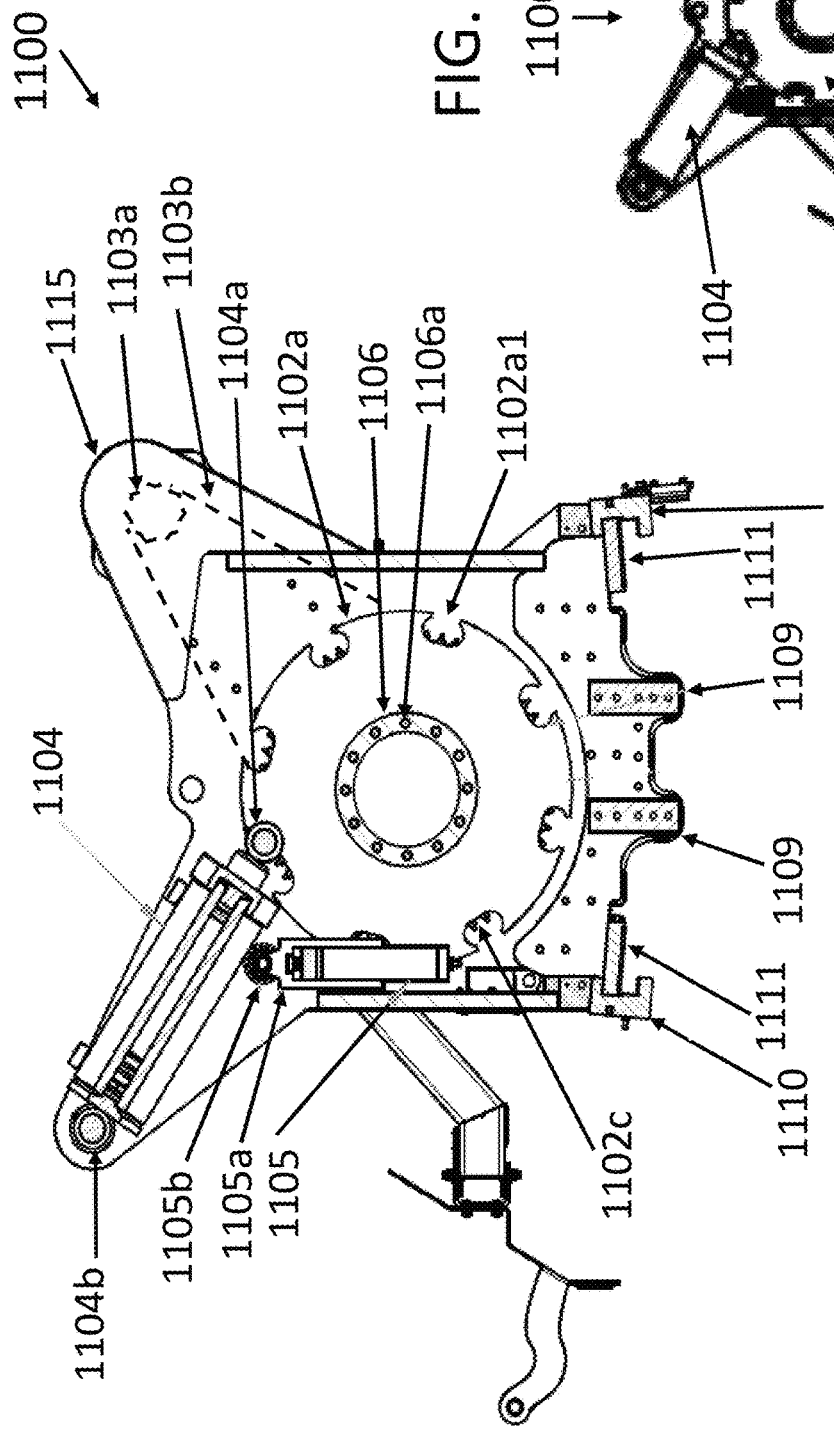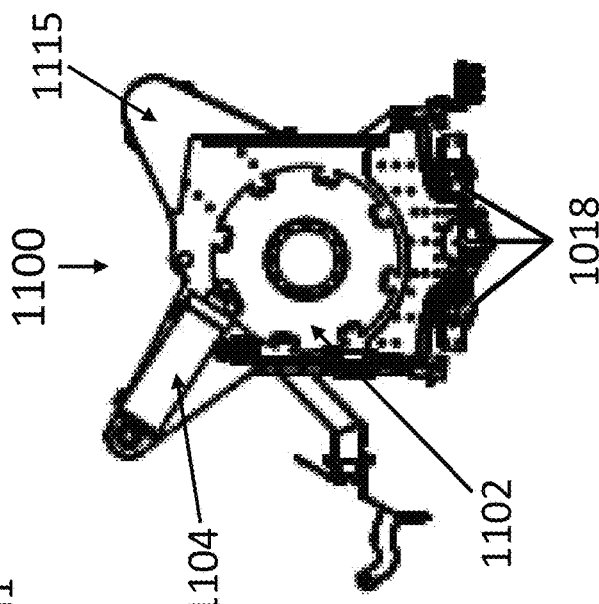

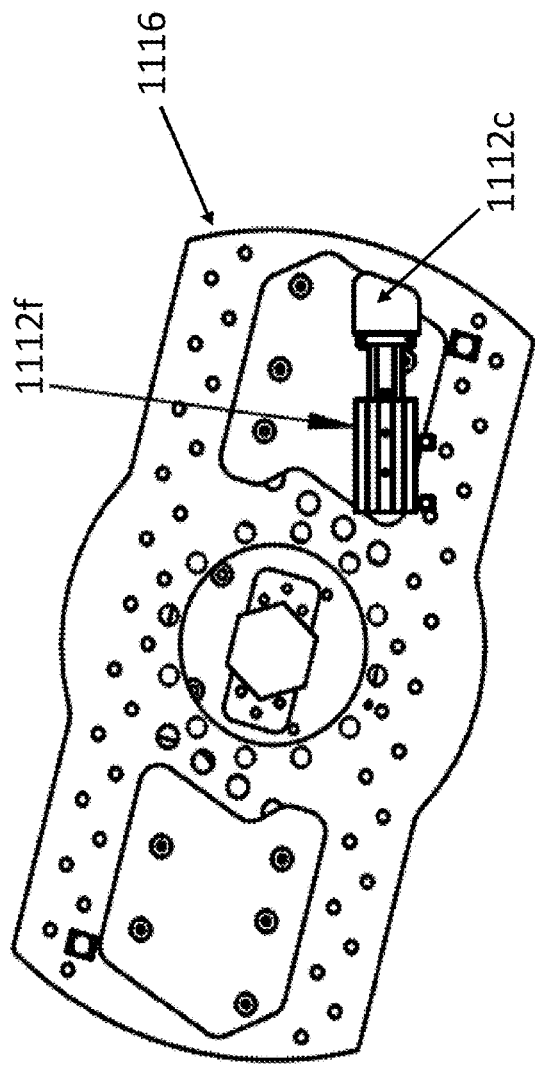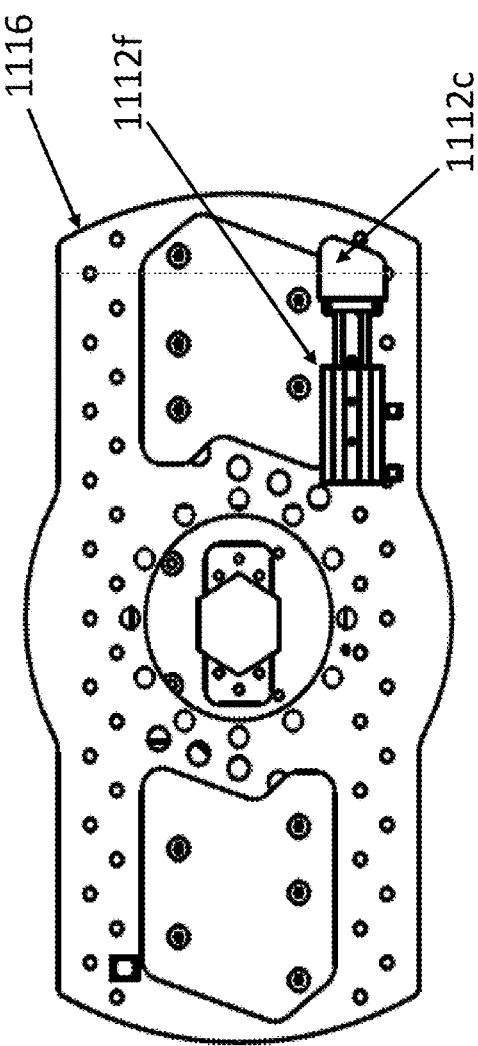

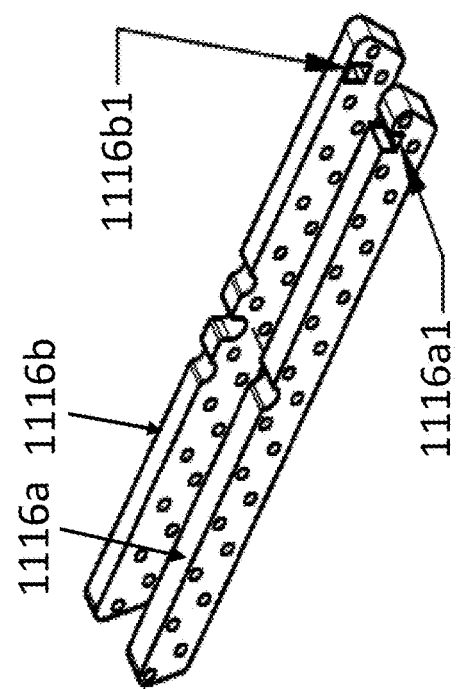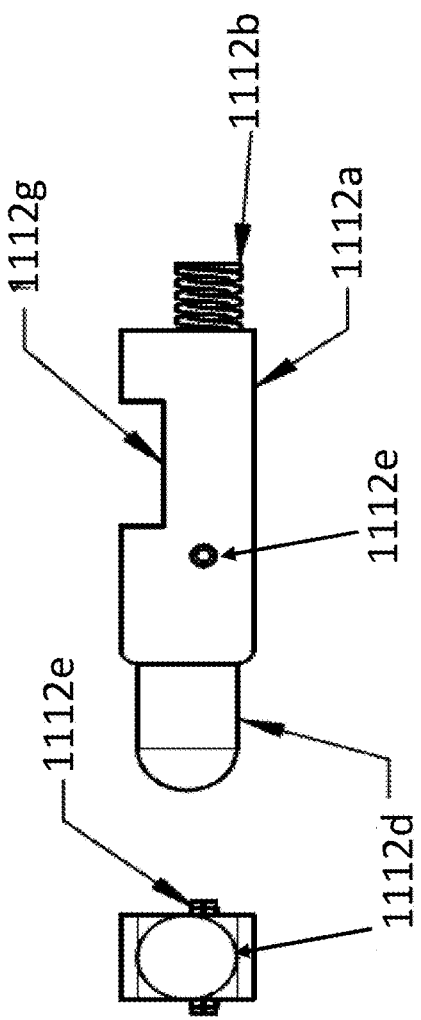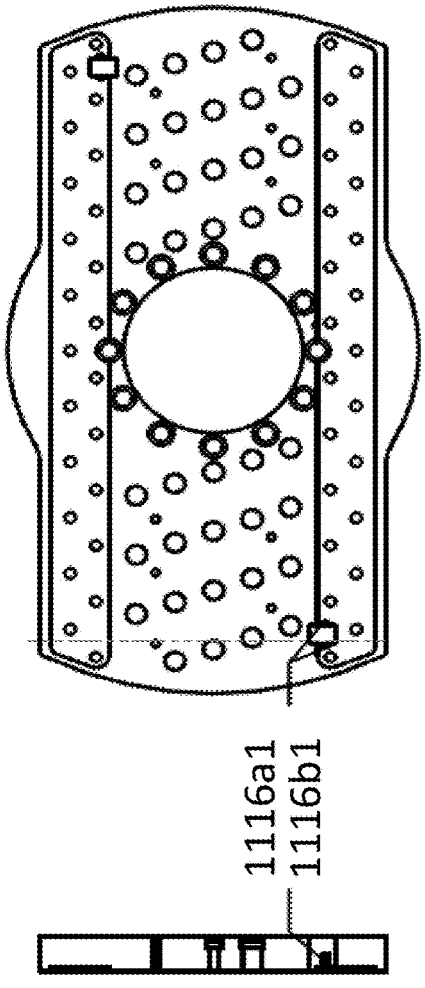

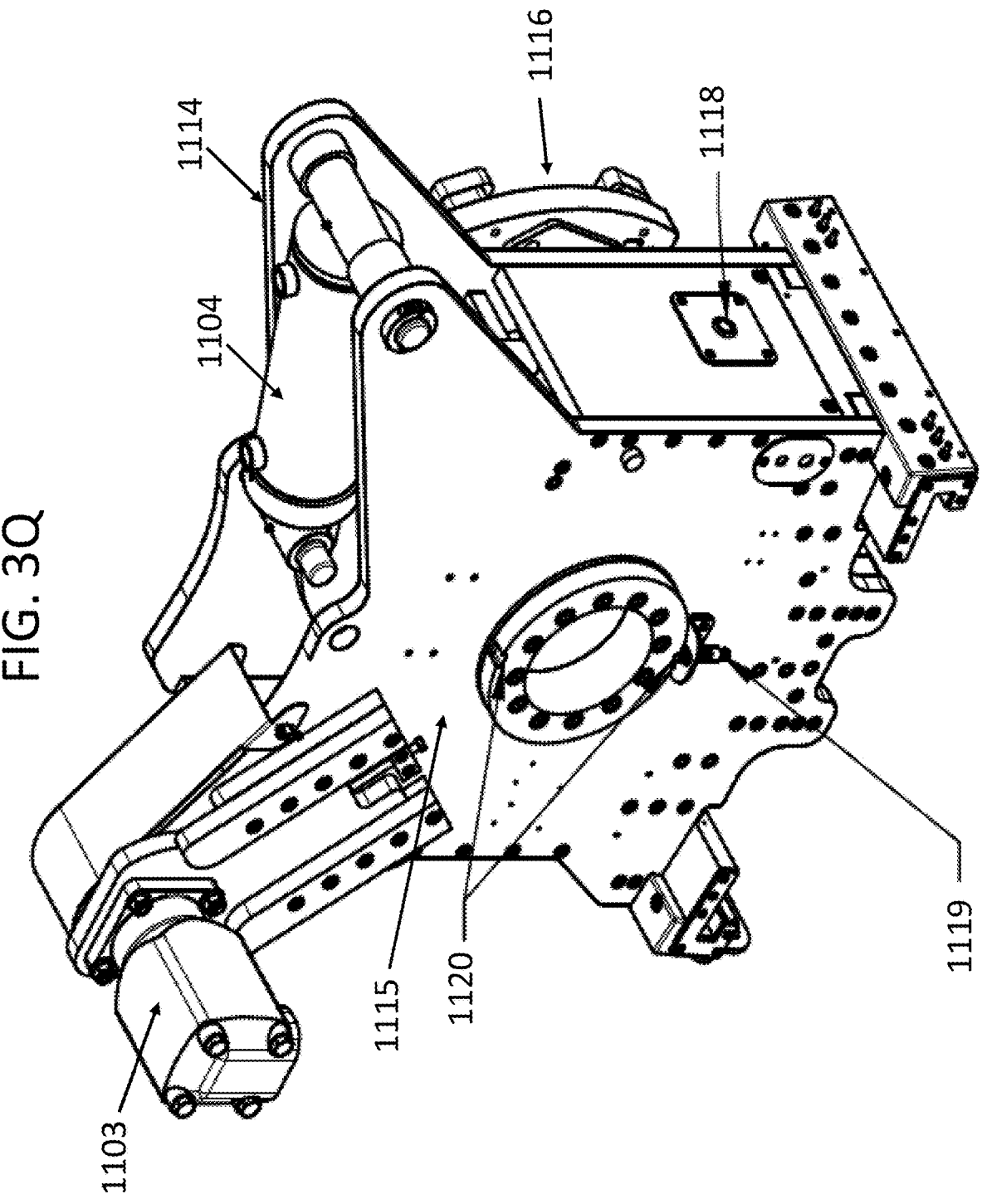

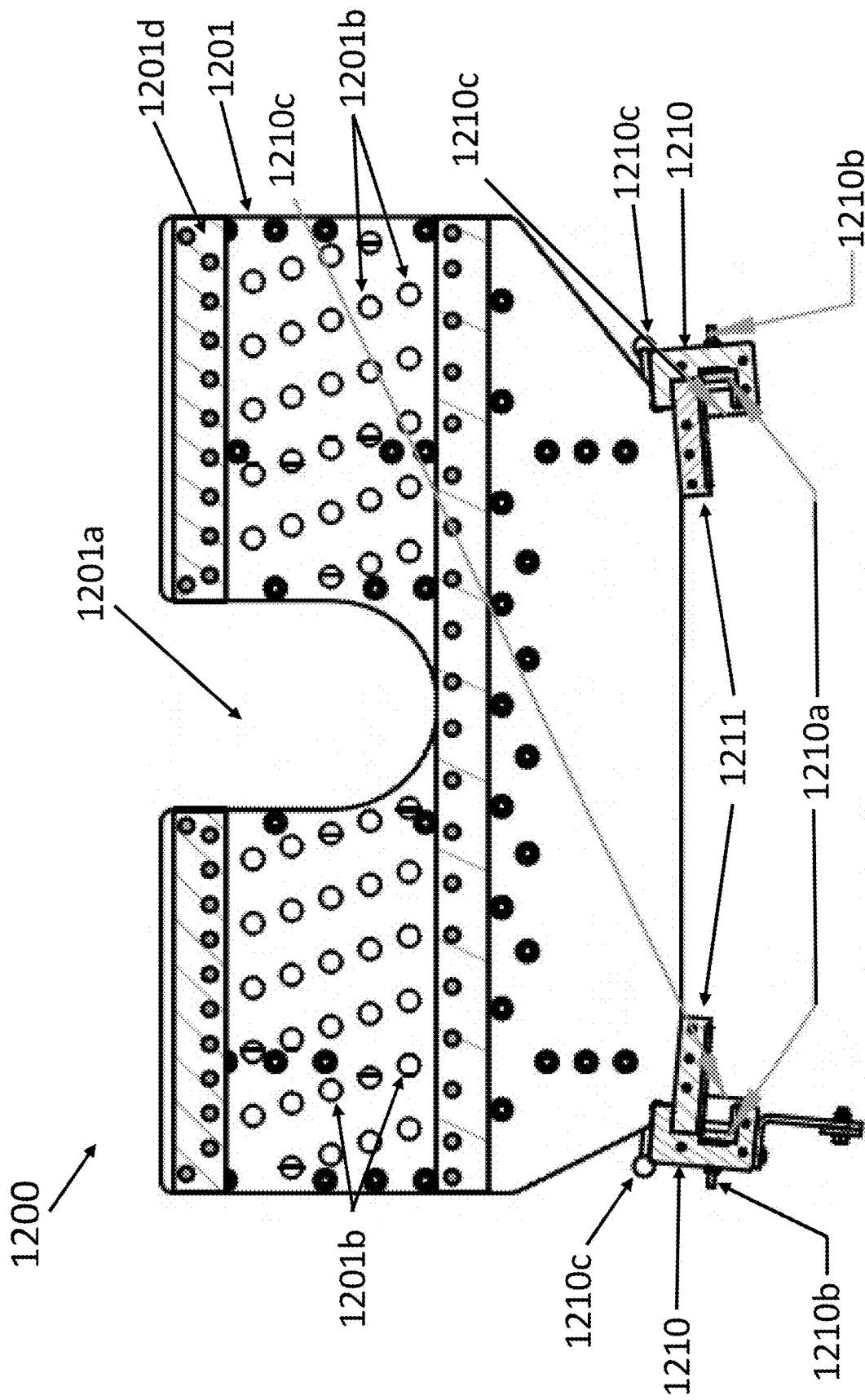

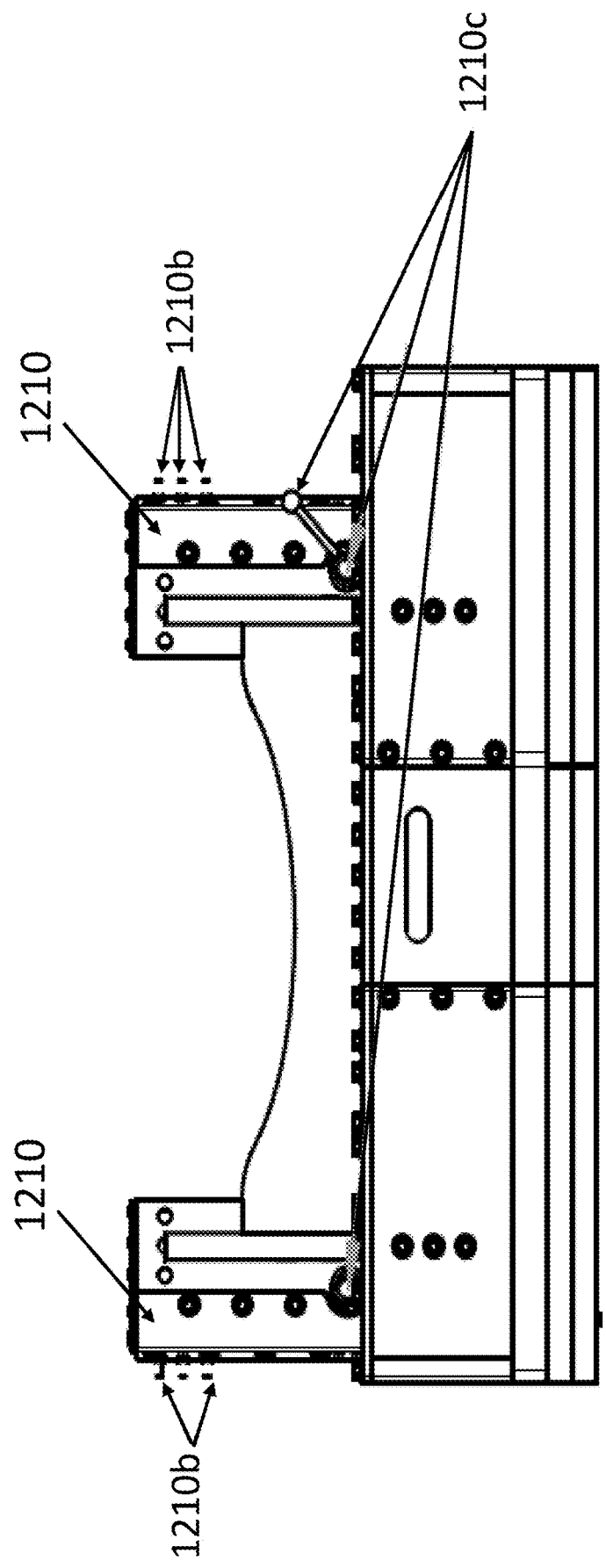

LARGE SCALE HYDRAULIC CYLINDER ASSEMBLY, DISASSEMBLY AND MAINTENANCE SYSTEM

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71 (d).

BACKGROUND OF THE INVENTIVE CONCEPT

1. Field of the Invention

The present inventive concept relates to a large scale hydraulic cylinder assembly, disassembly and maintenance system, and more particularly, to a large scale hydraulic cylinder (and other large scale parts) assembly, disassembly and maintenance system, which can adjust to different size hydraulic cylinders and other large scale parts, as well as apply both high speed assembly and disassembly and high torque assembly and disassembly thereof.

2. Description of the Related Art

Large scale hydraulic cylinders are used on all types of mechanical and construction equipment, including manufacturing machinery, elevators, excavation vehicles, such as forklifts, bulldozers, loaders, dump trucks, back hoes, etc. While these large scale hydraulic cylinders need to be assembled, maintained, and sometimes disassembled, they are very heavy and cannot be maintained, assembled or disassembled without the aid of cranes and other very large mechanical, hydraulic and/or electrical equipment. Other attempts at providing systems to assemble, disassemble and maintain large scale hydraulic cylinders result in unstable systems which become compromised, such as being twisted or lacking sufficient torque, as a result of attempting to unscrew nuts tightly secured to the heads and tail ends of these large scale hydraulic cylinders. Still other systems designed to assembly, disassemble and maintain large scale hydraulic cylinders require being bolted to the floor in order to avoid being destroyed while attempting to assemble, disassemble and maintain large scale hydraulic cylinders.

One type of equipment known to be used to service a hydraulic cylinder is disclosed in U.S. Pat. No. 3,900,938 by Blomgren et al. As illustrated in FIGS. 1A and 1B of Blomgren et al., disclosed is a hydraulic cylinder service machine which includes a rectangular frame and a horizontal central mounting post mounted thereon which has extensions that are adjustable in length to allow the machine to handle and mount a wide variety of cylinders for repair. More specifically, a rectangular frame is supported by four legs 12, and a mounting post 13 includes a telescoping member 14. Once the cylinder's housing 19 is placed on spaced apart support rollers 21 along the mounting post 13 an adjustable spanner wrench retainer 22 mounted on the post 13 can engage with the cylinder housing cap 23 to prevent the same from turning while a closed end of the cylinder housing 19 can be mounted in a chuck assembly 20. A worm gear 37 can be rotated by a driven sprocket 36 disposed within a worm gear drive mechanism 33 to slide the telescoping member 14. The worm gear 33 is moved by a motor 34 having an output shaft mounting a driving sprocket 35. A hydraulic torquing means 41 for rotating the chuck 20 includes a shaft 42 and torque plate 43. The torque plate 43 is driven by a portable hydraulic ram 45 operated by a pump 46. The pump 46 will cause a ram piston 48a to turn the torque plate 43, which in turn will rotate the chuck 20 to either assemble or disassemble the hydraulic cylinder housing 19. Since the torquing plate 43 is only rotated through a partial revolution for full extension of the portable ram piston 45b, continual power rotation of the torquing plate 43 requires withdrawing the ram piston 48a, moving block 48, and securing pin 49 to an adjacent pin hole 44 which is closer to the end of the withdrawn piston. As stated in column 5, lines 41-43, manual turning means are employed to perform the necessary turning operations whenever high torque capacity of the ram is not required.

Accordingly, there is a need for a system to assemble, disassemble and maintain large scale hydraulic cylinders which can carry out all operations in one stable, simple system.

There is also a need for a system to assemble, disassemble and maintain large scale hydraulic cylinders which can contain all pressure and torque forces in one stable, simple system.

There is also a need for a system to assemble, disassemble and maintain large scale hydraulic cylinders which can provide multiple reservoirs, one reservoir for waste oil, one reservoir for machine hydraulic oil and one reservoir for repaired hydraulic cylinder pressure test oils.

There is also a need for a system to assemble, disassemble and maintain large scale hydraulic cylinders which includes a single, stand-alone pipe structure which can handle all levels or torque required without being bolted to the floor.

Other features and advantages of the present inventive concept are described within the detailed description of the invention provided below, but are not limited thereto.

SUMMARY OF THE INVENTIVE CONCEPT

The present general inventive concept provides a large scale hydraulic cylinder assembly, disassembly and maintenance system, and more particularly, to a large scale hydraulic cylinder (and other large scale parts) assembly, disassembly and maintenance system, which can adjust to different size hydraulic cylinders and other large scale parts, as well as apply both high speed assembly and disassembly and high torque assembly and disassembly thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hydraulic cylinder assembly, disassembly and maintenance system, comprising: a cylindrical pipe having first and second ends and resting on an integrated foot and crane mount, the cylindrical pipe including: a pair of parallel guide rails fixed along a top portion thereof; and a pair of ball screws disposed in parallel between the pair of guide rails extending along a length of the cylindrical pipe, each ball screw including a sprocket attached to one end thereof at the first end of the cylindrical pipe; an overhead crane assembly including at least one support beam extending from the integrated foot and crane mount and supporting an overhead crane at a position above and extending along the length of the cylindrical pipe, the overhead crane including at least two rolling hoists that roll along the overhead crane to hoist and move a hydraulic cylinder over the cylindrical pipe; a torque head assembly including: a pair of rail guides fixed to a bottom thereof to lock onto and slide along the pair of guide rails; a ball screw push bar disposed between the pair of rail guides, the ball screw push bar including a pair of ball screw nuts each to threadingly receive a corresponding ball screw therethrough to move the torque head assembly along the guide rails when the ball screws are rotated; a rotating reel having notches around a circumferential surface thereof and an axis of rotation in parallel with the cylindrical pipe and a torque head tooling connector plate connected thereto and configured to rotate along with the rotating reel and to receive a first tooling piece thereon to securely engage with a first end of a hydraulic cylinder to rotate the first end of the hydraulic cylinder; a torque head hydraulic motor configured to rotate the rotating reel at a high speed and low torque; and a high torque cylinder configured to extend and retract to rotate the rotating wheel at a lower speed and higher torque than the torque head hydraulic motor; and a tail stock assembly including: a tail stock tooling connector plate having a pair of slide plates to slide along the guide rails and configured to receive a second tooling piece thereon to securely engage with a second end of the hydraulic cylinder in a non-rotating manner while the torque head tooling connector plate and first tooling piece rotate the first end of the hydraulic cylinder.

In an exemplary embodiment, the hydraulic cylinder assembly, disassembly and maintenance system can further comprise a ball screw hydraulic motor disposed at the first end of the cylindrical pipe and having a sprocket to engage with and rotate the pair of ball screws.

In another exemplary embodiment, the hydraulic cylinder assembly, disassembly and maintenance system can further comprise a lift cylinder configured to lift the high torque cylinder away from the rotating wheel and to lower the high torque cylinder to engage with the rotating wheel when a high torque and low speed rotation of the rotating wheel is desired.

In another exemplary embodiment, the hydraulic cylinder assembly, disassembly and maintenance system can further comprise an electrical panel disposed at the first end of the cylindrical pipe to control power to the ball screw hydraulic motor, the torque head hydraulic motor, the high torque cylinder and the lift cylinder.

In still another exemplary embodiment, the torque head assembly rail guides each can comprise a corresponding slide plate configured to rest on a respective guide rail; and an adjustable shim configured to be adjustable to maintain the rail guide in contact with a side of the respective guide rail.

In still another exemplary embodiment, the tail stock slide plates each can comprise a corresponding tail stock rail guide to guide the slide plates along the respective guide rail; and an adjustable shim configured to be adjustable to maintain the tail stock rail guide in contact with a side of the respective guide rail.

In yet another exemplary embodiment, the rotating reel of the torque head assembly can comprise two circular plates disposed in parallel and separated by a barrel, wherein each of the circular plates includes the notches disposed around a circumference thereof to be engaged with the high torque cylinder to rotate the two circular plates, the barrel and the torque head tool connector plate at low speed and high torque; and a sprocket connected to the barrel to engage with a chain connected to the torque head hydraulic motor to rotate the sprocket, the two circular plates, the barrel and the torque head tooling connector plate at high speeds.

In still another exemplary embodiment, the torque head tooling connector plate can include a torque head connector plate rail assembly disposed at a top and bottom thereof to slidingly receive a tooling piece therebetween; and a plurality of holes extending therethrough to align with corresponding holes formed through the tooling piece to receive a peg therethrough to secure the tooling piece to the torque head tooling connector plate.

In yet another exemplary embodiment, the tail stock tooling connector plate includes a tail stock connector plate rail assembly disposed at a top and bottom thereof to slidingly receive a tooling piece therebetween; and a plurality of holes extending therethrough to align with corresponding holes formed through the tooling piece to receive a peg therethrough to secure the tooling piece to the tail stock tooling connector plate.

The foregoing and/or other features and utilities of the present general inventive concept may also be achieved by providing a hydraulic cylinder maintenance system, comprising: a pipe having first and second ends secured to a pair of bases, the pipe including: a pair of parallel guide rails fixed along a top portion thereof; and a pair of ball screws extending along a length thereof between the pair of guide rails; and a ball screw push bar including a pair of ball screw nuts each to threadingly receive a corresponding ball screw therethrough to move along the length of the pipe when the ball screws are rotated; an overhead crane assembly secured to the pair of bases and supporting an overhead crane disposed above and extending along the length of the pipe, the overhead crane including at least two rolling hoists that roll along the overhead crane to hoist and move large objects over the pipe; a torque head assembly including: a pair of rail guides fixed to a bottom thereof and configured to slide along the pair of guide rails; a pair of ball screw push bar ears fixed to a bottom thereof to receive the ball screw push bar therebetween to guide the torque head assembly along the guide rails when the ball screws are rotated; a rotating reel having an axis of rotation in parallel with the pipe, the rotating reel including: a torque head tooling connector plate connected thereto which rotates therewith and is configured to receive a first tooling piece thereon to securely engage with a first end of a hydraulic cylinder to rotate the first end of the hydraulic cylinder; and a driving means configured to rotate the rotating reel and torque head tooling connector plate; and a tail stock assembly including: a tail stock tooling connector plate configured to receive a second tooling piece thereon to securely engage with a second end of the hydraulic cylinder in a non-rotating manner while the rotating reel and torque head tooling connector plate rotate the first end of the hydraulic cylinder, the tail stock tooling connector plate including a pair of slide plates to slide along a corresponding guide rail.

In an exemplary embodiment, the rotating reel can further comprise: a sprocket connected to the rotating reel to receive a rotating force to rotate the rotating reel, the torque head tooling connector plate and the first tooling piece; and notches formed along a circumference thereof to receive a second rotating force to rotate the rotating reel, the torque head tooling connector plate and the first tooling piece.

In another exemplary embodiment, the driving means can comprise: a driving motor which engages with the sprocket of the rotating reel to rotate the rotating reel, the torque head tooling connector plate and the first tooling piece at a high speed and low torque; a high torque cylinder including a horizontal rod that which is configured to fit in the notches formed along the circumference of the rotating reel and to extend and retract to rotate the rotating wheel at a lower speed than the driving motor and at a higher torque than the driving motor; and a lift cylinder configured to lift the high torque cylinder rod away from the notches in the rotating wheel and to lower the high torque cylinder rod to engage with the notches of the rotating wheel to provide a higher torque and a lower speed rotation of the rotating wheel than the driving motor.

In still another exemplary embodiment, the tail stock slide plates can each comprise: a corresponding tail stock rail guide to guide the slide plates along the respective guide rail; and an adjustable shim configured to be adjustable to maintain the tail stock rail guide in contact with a side of the respective guide rail.

In still another exemplary embodiment, the torque head tooling connector plate can include: a torque head tooling connector plate rail assembly disposed at a top and bottom thereof to slidingly receive a tooling piece therebetween; and a plurality of holes extending therethrough to align with corresponding holes formed through the tooling piece to receive a peg therethrough to secure the tooling piece to the torque head tooling connector plate.

In yet another exemplary embodiment, the tail stock tool connector plate can include: a tail stock tooling connector plate rail assembly disposed at a top and bottom thereof to slidingly receive a tooling piece therebetween; and a plurality of holes extending therethrough to align with corresponding holes formed through the tooling piece to receive a peg therethrough to secure the tooling piece to the tail stock tooling connector plate.

In still another exemplary embodiment, the cylindrical pipe can include a waste oil tank disposed within the cylindrical pipe to receive waste oil through a drain hole disposed on a top of the cylindrical pipe; and a waste oil discharge pipe connected to the waste oil tank and extending from the cylindrical pipe, the waste oil discharge pipe including a valve to discharge waste oil from the waste oil tank through the waste oil discharge pipe.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1A illustrates a conventional hydraulic cylinder service machine;

FIG. 1B illustrates a drive mechanism for the conventional hydraulic cylinder service machine illustrated in FIG. 1A;

FIG. 2A illustrates a side plan view of a large scale hydraulic cylinder assembly, disassembly and maintenance system, according to an example embodiment of the present inventive concept;

FIG. 2B illustrates lengthwise view of a cylinder pipe and rails of the large scale hydraulic cylinder assembly, disassembly and maintenance system according the example embodiment of FIG. 2A;

FIG. 2C illustrates a plan view of the large scale hydraulic cylinder assembly, disassembly and maintenance system according to the example embodiment of FIG. 2A;

FIG. 2E illustrates a lengthwise view of the hydraulic cylinder assembly, disassembly and maintenance system, according to an example embodiment of FIG. 2A;

FIG. 3B illustrates a side view of the torque head according to the example embodiment of FIG. 3A;

FIG. 3C illustrates a rotating reel assembly of the torque head according to FIG. 3B, according to an example embodiment or the present inventive concept;

FIG. 3D illustrates an internal front view of the torque head of FIGS. 3A and 3B, with a front guard plate removed;

FIG. 3E illustrates the internal front view of the torque head of FIGS. 3A and 3B, with a sprocket and chain drive system thereof;

FIG. 3L illustrates a front view of the torque head tool connector plate illustrated in FIG. 3J rotated slightly off from a horizontal position;

FIG. 3M illustrates a front view of the torque head tool connector plate illustrated in FIG. 3J in a horizontal position;

FIG. 3N illustrates a sliding lock key of the tool locking system illustrated in FIG. 3J;

FIG. 3O illustrates a plan view of a torque head tool connector plate rail and a torque head connector plate rail cap, according to an example embodiment of the present inventive concept;

FIG. 3P illustrates a front view of a torque head tool connector plate with the torque head tool connector plate rail and a torque head connector plate rail cap of FIG. 3O connected thereto;

FIG. 3Q illustrates a plan view of a back of the torque head apparatus illustrated in FIG. 3A;

FIG. 4A illustrates a front face view of a tail stock for the large scale hydraulic cylinder assembly, disassembly and maintenance system of FIG. 2A, according to an example embodiment of the present inventive concept;

FIG. 4B illustrates a top view of the tail stock according to an example embodiment of FIG. 4A.

Figure 2D:
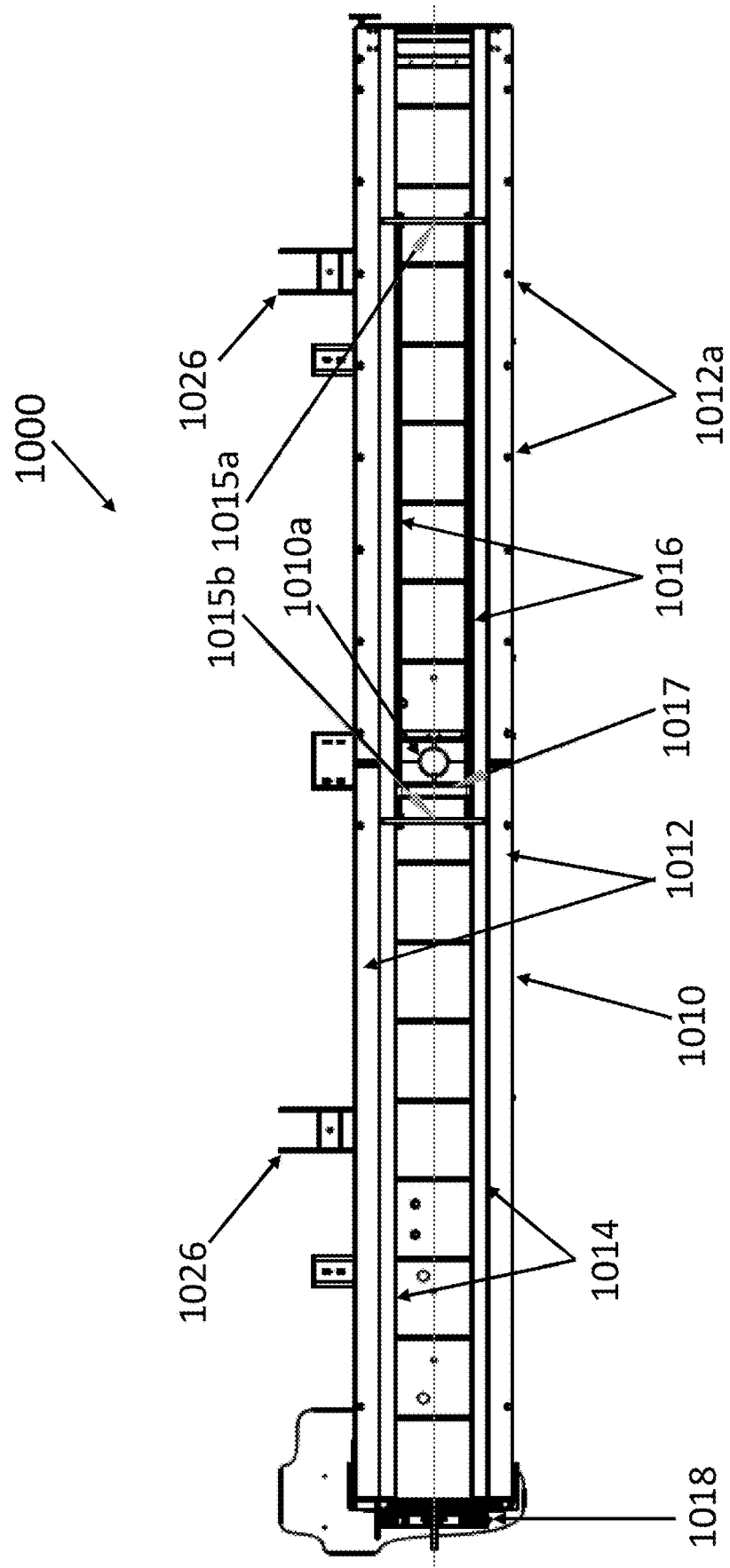
FIG. 2D illustrates a top view of the cylinder pipe and rails of the large scale hydraulic cylinder assembly, disassembly and maintenance system according the example embodiment of FIG. 2A.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Hereinafter, one or more exemplary embodiments of the present general inventive concept will be described in detail with reference to accompanying drawings.

Example embodiments of the present general inventive concept are directed to a large scale hydraulic cylinder assembly, disassembly and maintenance system, and more particularly, to a large scale hydraulic cylinder (and other large scale parts) assembly, disassembly and maintenance system which can adjust to different size hydraulic cylinders, and other large scale parts, as well as apply both high speed and low torque assembly and disassembly and high torque low speed assembly and disassembly to such different size hydraulic cylinders, and other large scale parts.

FIG. 2A illustrates a large scale hydraulic cylinder assembly, disassembly and maintenance system 1000 according to an example embodiment of the present inventive concept. It is to be noted that this system 1000 can be used to assemble, disassemble, and perform maintenance on any size large scale hydraulic cylinders, as well as other types of cylindrical devices which require stabilizing one end thereof and turning an opposite end under high speed or high torque, as is described in more detail below with reference to the drawings.

Referring to FIGS. 2A and 2B, a long cylindrical pipe 1010 is designed to provide a solid, stabile, torque free base. This cylindrical pipe 1010 is configured to be free standing, and therefore can be moved to any location with a hoist, crane or other lifting device which can lift such heavy equipment. The cylindrical pipe 1010 is preferably configured to be approximately 24 feet long and have a diameter of approximately 20 inches. However, the cylindrical pipe 1010 can have a different length and/or diameter depending on the type of size or type of hydraulic cylinders intended to be assembled or disassembled. The cylindrical pipe 1010 is preferably is formed of a steel or cast iron material to be able to withstand torque caused by machinery connected thereto, which will be described in more detail below. The upper most portion of the cylindrical pipe 1010 can have slight taper downward from both ends thereof toward a center portion, at which a waist oil drain hole 1010a (see FIG. 2D) can be disposed thereat to drain used oil into a waste oil tank disposed within the cylinder pipe 1010. With this configuration any oils which may leak from a hydraulic cylinder being worked on will drip onto the top surface of the cylinder pipe 1010 and flow to the center thereof into the waste oil drain hole 1010a. The cylindrical pipe 1010 includes at least three reservoirs: one reservoir to collect waste oil which drips from a hydraulic cylinder being worked on and having a 250 gallon capacity; a second reservoir to provide hydraulic oil to the various hydraulic machines included with the large scale hydraulic cylinder assembly, disassembly and maintenance system 1000 and having a 25 gallon capacity; and a third reservoir to contain oil for use in testing repaired hydraulic cylinders and having a 55 gallon capacity.

A first end of the cylindrical pipe 1010 can have a circuit panel 1300 connected thereto or adjacent thereto to provide all hydraulic and other necessary electrical controls required to operate each of the plurality of tooling apparatuses which are used with and connected to the hydraulic cylinder assembly, disassembly, and maintenance system 1000. A second opposite end of the cylindrical pipe 1010 can include a circumferential flared outward portion 1010b extending at an angle of 90 degrees from the axis of the pipe 1010. The flared outward portion 1010b can include holes 1010b1 extending therethrough to receive a corresponding bolt, such that another cylindrical pipe 1010 with a corresponding flared outward portion 1010b include holes 1010b1 extending therethrough can be aligned with and bolted thereto in order to extend the hydraulic cylinder assembly, disassembly and maintenance system 1000 to have a length of 48 feet. The holes 1010b1 are preferably spaced around the flared portion 1010b such that the cylindrical pipe 1010 can be secured firmly to another cylindrical pipe 1010, if desired in order to assembly, disassemble or maintain a hydraulic cylinder having a length greater than 24 feet.

Referring to FIGS. 2A-2D, a pair of parallel rails 1012 can be fixed to and extend along an entire length of the cylindrical pipe 1010. The rails 1012 can be formed of solid steel and can rest on a respective rectangular tube 1013 which also extends along the entire length of the cylindrical pipe 1010. As illustrated in FIG. 2B, each rectangular tube 1013 can be fixed to a steel or cast iron frame 1013a, which can be welded to or bolted along the length of the cylindrical pipe 1010. The cast iron frame 1013a is preferably formed to have a curved shape such that oil which leaks from hydraulic cylinders being worked on above the cylindrical pipe 1010 will flow to the tapered upper portion thereof and downward into the waste oil drain hole 1010a formed therein.

The rails 1012 are configured to receive different tooling apparatuses thereon and to provide for these tooling apparatuses to slide along the rails 1012 via respective rail guides. Different tooling apparatuses can include, for example, a torque head apparatus and a tail stock 1200, which are described in more detail below.

Referring to FIGS. 2C-2D, the rails 1012 preferably include rail holes 1012a formed therethrough along the entire length thereof. These rail holes 1012a are preferably equally spaced apart along the length of each rail to receive a pin therethrough to hold the tail stock 1200 at a desired location along the cylinder pipe 1010, as described in more detail below. The tail stock 1200 is configured to slide along the rails 1012 for multiple reasons, including adjusting position based on the length of a hydraulic cylinder being worked on and adjusting position to receive a head or tail end of a hydraulic cylinder in a tooling piece attached thereto after the other end of the hydraulic cylinder being worked on is secured to the torque head apparatus, as will be described in more detail below.

Referring to FIGS. 2A, 2C and 2E, a pair of integrated foot/crane mounts 1028 can be provided at a bottom of the horizontally disposed cylinder pipe 1010 to secure the cylinder pipe 1010 in place on the ground. The integrated foot/crane mounts 1028 perform as a secure base for the cylinder pipe 1010 and are preferably welded to the bottom of the cylinder pipe 1010 and spaced apart from each other by a sufficient distance to provide stability to the cylinder pipe 1010 with respect to the ground. Once the cylinder pipe 1010 is placed on a floor with the integrated foot/crane mounts 1028 acting as a secure base the system 1000 will not roll, tilt or twist.

The integrated foot/crane mounts 1028 extend outward from one side of the cylinder pipe 1010 to receive a respective overhead crane support beam 1026. Each overhead crane support beam 1026 can be bolted to a respective integrated foot/crane mount 1028. The overhead crane support beams 1026 are preferably angled to support an overhead crane (also referred to as a sky hook) 1024 to be disposed directly above and along the length of the cylinder pipe 1010. The overhead crane 1024 is preferably disposed above the cylinder pipe 1010 by a predetermined number of feet sufficient to hoist and hover a hydraulic cylinder (not illustrated) in the air above the cylinder pipe 1010 to be connected to tooling attached to both torque head apparatus and the tail stock 1200, as described in more detail below. The overhead crane 1024 is configured to include a pair of rolling chain hoists 1030 each with a three ton capacity. Overhead crane stabilizer bars 1025 can be provided to add extra stability to the overhead crane 1024 with respect to the overhead crane support beams 1026. Overhead crane stabilizer trusses 1027 can be provided on each side of the overhead crane support beams 1026 to provide additional support to the overhead crane support beams 1026 to prevent to angled portions thereof from buckling as a result of heavy hydraulic cylinders being hoisted above the cylinder pipe 1010.

Referring to FIGS. 2A and 2C, a waste oil discharge tank 1030 can be disposed within the cylinder pipe 1010 and connected to the waste oil drain hole 1010a. A waste oil discharge pipe 1032 with a valve 1032a can be connected to the waste oil discharge tank 1030. When the waste oil discharge tank 1030 becomes full of waste oil a plug can be installed in the waste oil drain hole 1010a and then a low pressure air system can be used to pressurize the waste oil discharge tank 1030 while the valve of the waste oil discharge pipe 1032 is opened to drain out the waste oil from the waste oil discharge tank 1030.

Referring to FIG. 2E, the pair of rolling chain hoists 1030 can be slidingly connected to the overhead crane 1024. The hoists 1030 can include a strap (not illustrated) to wrap around a hydraulic cylinder to hold the hydraulic cylinder in the air above the cylinder pipe 1010. The straps can be adjusted upward and downward by a chain and pulley system to raise and lower a hydraulic cylinder via the straps.

Once a hydraulic cylinder is hoisted up in the air above the cylinder pipe 1010 with the overhead crane 1024 via the hoists 1030 a first end of the hoisted hydraulic cylinder can be connected to tooling piece attached to one of a torque head apparatus or a tail stock 1200 while a second end of the hydraulic cylinder can be connected to the tooling piece attached to the other one of the torque head apparatus or a tail stock 1200, as described in more detail below.

Figure 3A:
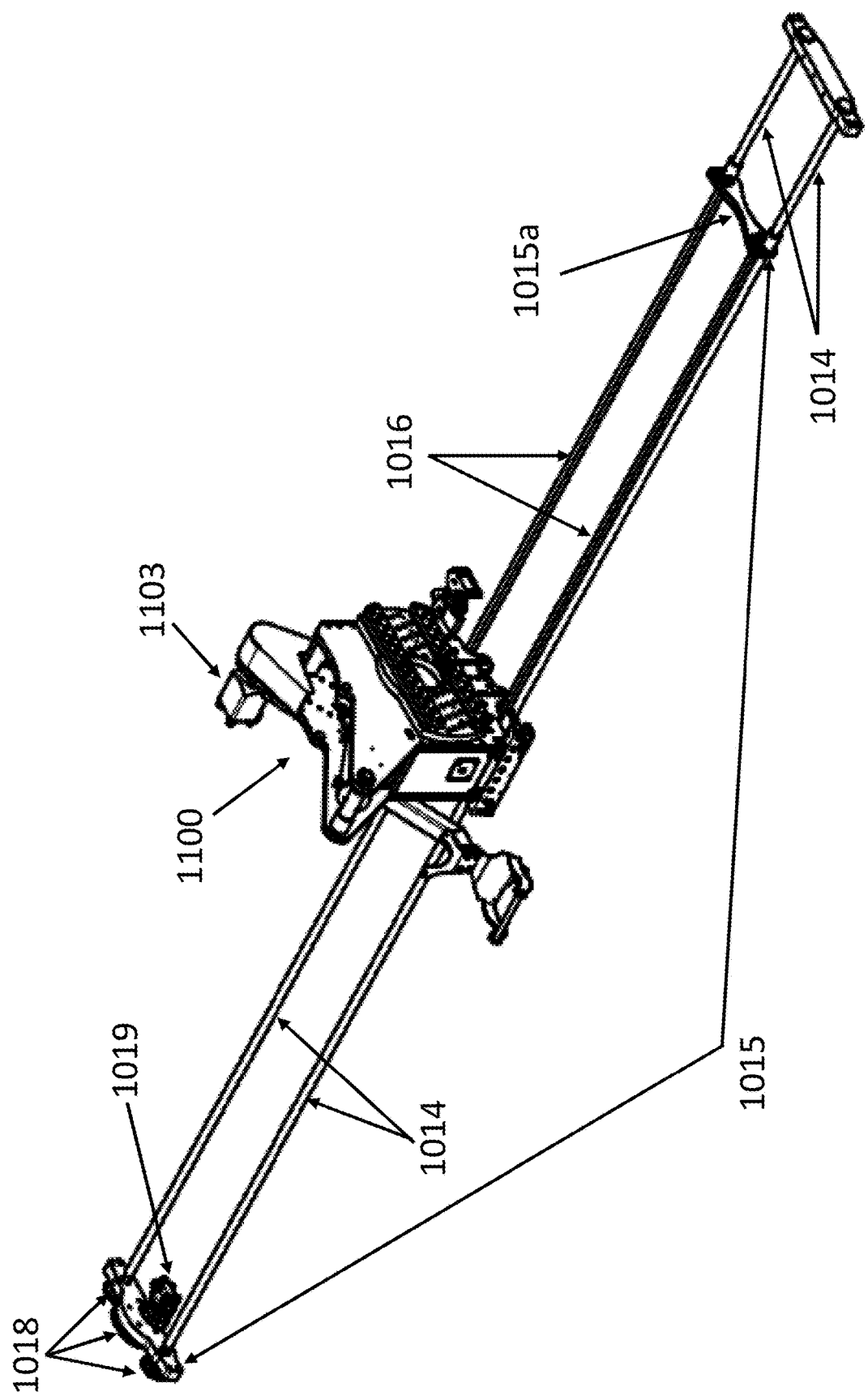
FIG. 3A illustrates a plan view of a torque head apparatus and corresponding drive system for the large scale hydraulic cylinder assembly, disassembly and maintenance system of FIG. 2A, according to an example embodiment or the present inventive concept.

Referring to FIGS. 2C-2D and 3A, a pair of ball screws 1014 can be provided in parallel along the length of the cylinder pipe 1010. The ball screws 1014 can be disposed above the upper surface of the cylinder pipe 1010 and between the guide rails 1012. The ball screws 1014 can be mechanically rotated by a sprocket and chain system 1018 (see FIGS. 2D and 3A). More specifically, a sprocket of the sprocket and chain system 1018 can be rotatingly engaged with a ball screw sprocket connected to one end of each ball screw 1014. A chain can also be connected between the sprocket of the sprocket and chain system 1018 and a sprocket connected to a hydraulic rotating motor 1019 such that when the hydraulic rotating motor 1019 rotates the sprocket and chain system 1018 will also rotate, which in turn will rotate the sprockets connected at the ends of the ball screws 1014.

A free sliding ball screw stabilizing unit 1015 can include two plates 1015a and 1015b in parallel and disposed a predetermined distance apart. Each plate of the free sliding ball screw stabilizing unit 1015 can include two holes extending therethrough. A first hole of each plate can receive one ball screw 1014 therethrough and a second hole of each plate can receive the other ball screw 1014 therethrough. A pair of ball screw stabilizing unit rods 1016 can each be connected between the first and second plates 1015a and 1015b of the free sliding ball screw stabilizing unit 1015 to hold the free sliding ball screw stabilizing unit 1015 together and to provide stability to the free sliding ball screw stabilizing unit 1015 and to the ball screws 1014. Further provided can be a ball screw push bar 1017 (see FIG. 2D) with ball screw nuts installed therein to threadingly receive the ball screws 1014 through the screw nuts such that when the ball screws 1014 are rotated by the sprocket and chain system 1018 the ball screw push bar 1017 will move along the ball screws 1014 as the threads of the ball screws 1014 are turned.

FIG. 3A illustrates a plan view of a torque head apparatus and corresponding drive system for the large scale hydraulic cylinder assembly, disassembly and maintenance system illustrated in FIG. 2A, according to an example embodiment or the present inventive concept; FIG. 3B illustrates a side view of the torque head according to the example embodiment of FIG. 3A; and FIG. 3C illustrates an expanded view of a rotating reel assembly 1102 of the torque head apparatus illustrated in FIG. 3B.

Referring to FIGS. 3A-3C, a torque head apparatus 1100 is provided to move along the guide rails 1012 above the cylindrical pipe 1010 illustrated in FIG. 2A. More specifically, the torque head apparatus 1100 can include a ball screw push bar notch 1018 in which the ball screw push bar 1017 can be positioned therein such that when the ball screw push bar 1017 is moved along the cylindrical pipe 1010 via rotation of the ball screws 1014 the torque head apparatus 1100 will also be moved along the top of the cylindrical pipe 1010 by sliding along the guide rails 1012. Furthermore, the plate 1015b of the free sliding ball screw stabilizing unit 1015 can also be disposed in the ball screw push bar notch 1018 such that the free sliding ball screw stabilizing unit 1015 and corresponding ball screw stabilizing unit rods 1016 slide along the ball screws 1014 to keep the ball screws 1014 equally distant apart and prevent the ball screws 1014 from bowing or vibrating due to the torque placed thereon as a result of the rotational force of the hydraulic rotating motor 1019 rotating the ball screws 1014. Accordingly, by activating the hydraulic rotating motor 1019 that turns the ball screws 1014 via the sprocket and chain system 1018 the torque head apparatus 1100 can be moved back and forth along the entire length of the cylindrical pipe 1010 via the guide rails 1012 as desired. This can be achieved by activating the hydraulic rotating motor 1019 to rotate in both the clockwise and counterclockwise directions by an electron controller disposed in electrical control panel 1300, or via a remote control which wirelessly communicates with the electronic controller in the electrical control panel 1300.

Figure 3F:
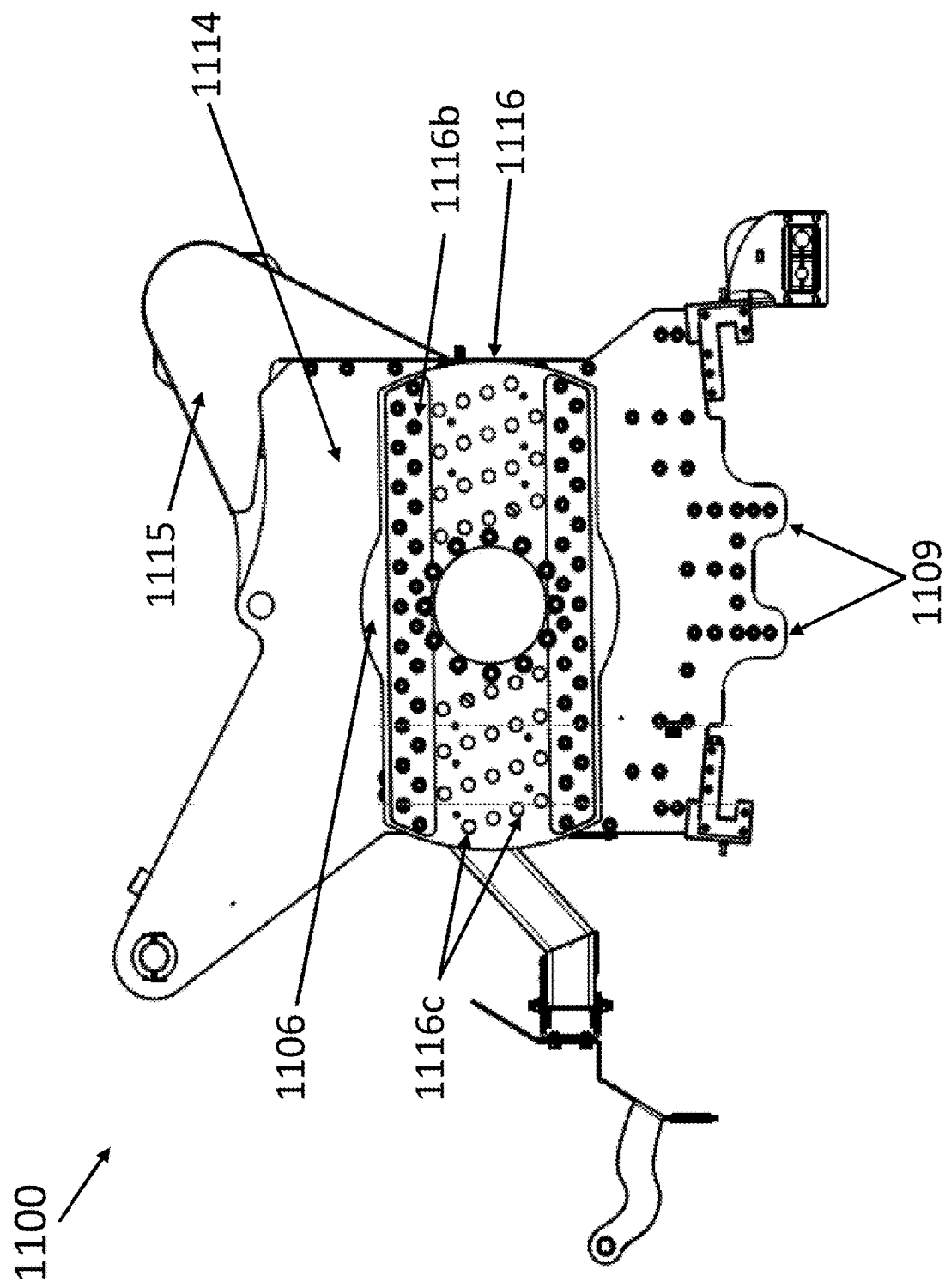
FIG. 3F illustrates a front view of the torque head of FIGS. 3A and 3B with a torque head tool connector plate attached thereto.
Figure 3G:
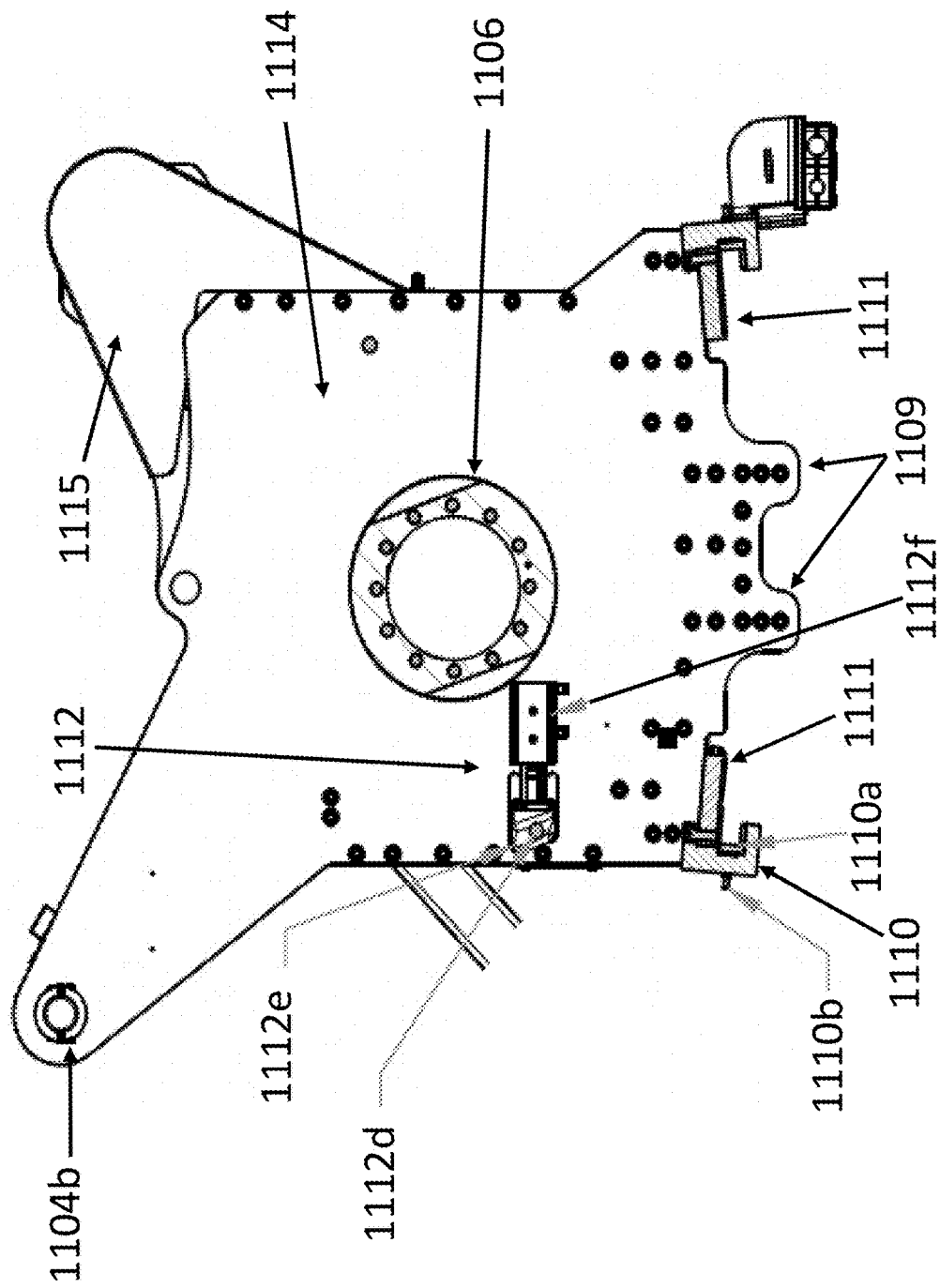
FIG. 3G illustrates a front view of the torque head of FIGS. 3A and 3B with a tool locking system as would be attached to a back side of torque head tool connector plate illustrated in FIG. 3F.

Referring to FIGS. 3A, 3D and 3E, the torque head apparatus 1100 can be configured to slide along the guide rails 1012, which extend above and along the length of the cylinder pipe 1010. More specifically, the torque head apparatus 1100 can include a corresponding pair of rail guides 1110 and slide plates 1111 disposed at opposite ends of the bottom of the torque head apparatus, as illustrated in FIGS. 3D and 3F. The pair of slide plates 1111 can be configured to be attached to the bottom of the torque head apparatus 1100 and disposed in parallel with each other and spaced apart to rest on top of the corresponding guide rails 1012. The rail guides 1110 can be configured to guide the torque head apparatus 1100 to remain on the guide rails 1012 as the slide plates 1111 of the torque head apparatus slide along the guide rails 1012 due to rotation of the ball screws 1014. The rail guides 1110 can also include a respective adjustable shims 1110a (see FIG. 3E) which can be adjusted by one or more adjustment screws 1110b to adjust the shim 1110a to move closer to the guide rails 12 to ensure that the rail guides 1110 guide the torque head apparatus 1100 in a straight path along the guide rails 1012. The slide plates 1111 and shims 1110a can be made of a plastic material which easily slide across the steel guide rails 1012. However, the slide plates 1111 and shims 1110a can be formed of any similar type of material which will enable the torque head apparatus 1100 to easily slide along the guide rails 1012 with minimal friction.

Operations of the torque head apparatus 1100 will now be described in detail with respect to FIGS. 3B-3H. Referring to FIGS. 3B-3D, the torque head apparatus 1100 can include a rotating reel 1102. The rotating reel 1102 can include two circular plates 1102a spaced apart and in parallel, and a circular barrel 1102b which extends through and is attached to a center of the two circular plates 1102a such that the two circular plates 1102a and a circular barrel 1102b rotate together as a reel or spool. The circular barrel 1102b extends through the center of both circular plates 1102a and through a hole formed through a front guard plate 1114 and a hole formed through a back guard plate 1115 such that the rotating reel 1102 rotates about the holes formed through the front guard plate 1114 and the back guard plate 1115. The circular barrel 1102b of the rotating reel 1102 can also extend through and be attached to a center portion of a sprocket 1102c. The sprocket 1102c can be disposed between one of the two circular plates 1102a and the back guard plate 1115 and is configured to rotate together with the entire rotating reel 1102, as illustrated in FIG. 3B. The sprocket 1102c can include teeth formed around the outer circumference thereof to receive a drive chain 1103b (see FIG. 3D) to drive the sprocket 1102c, and consequently, the entire rotating reel 1102. The sprocket 1102c can alternatively be driven by another sprocket with teeth which mesh with the teeth of the sprocket 1102c. Each of the two circular plates 1102a can have notches 1102a1 (see FIG. 3D) formed equally distant around circumferences thereof to receive a high torque cylinder rod 1104a therein to rotate the rotating reel 1102 at a slow speed and high torque, as described in more detail below.

Figure 3H:
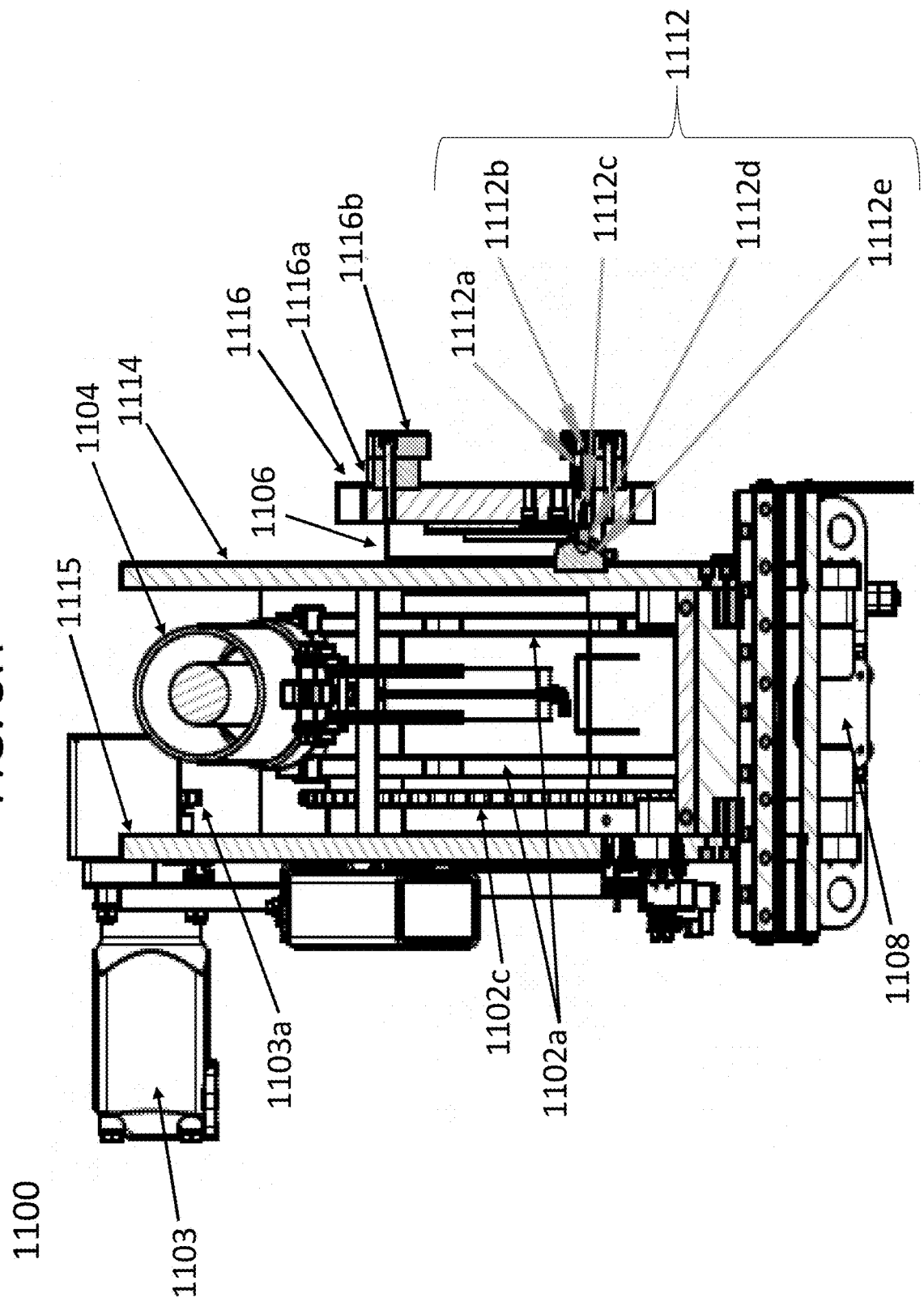
FIG. 3H illustrates a detailed side view of the torque head of FIGS. 3A and 3B with the torque head tool connector plate attached thereto.

Referring to FIGS. 3B and 3H, a high speed torque head motor 1103 can be attached to the back guard plate 1115. The high speed torque head motor 1103 can include a sprocket 1103a connected to and extending therefrom to be rotated by activation of the high speed torque head motor 1103. The high speed torque head motor 1103 can be a hydraulic driven motor and can be controlled by electrical control panel 1300. However, the high speed torque head motor 1103 can be an equivalent type of motor that will provide the intended purposes as described herein. The sprocket 1103a can be aligned with the sprocket 1102c of the rotating reel 1102 such that a drive chain 1103b (FIG. 3D) can be connected to both the high speed motor sprocket 1103a and the rotating reel sprocket 1102c. With this configuration the high speed torque head motor 1103 can turn the rotating reel 1102 at high speeds in both clockwise and counterclockwise directions by rotating the sprocket 1103a, which in turn will rotate the sprocket 1102c via the mutually connected drive chain 1103b. The torque head apparatus 1100 can travel the entire length of the cylindrical pipe 1010 on the ball screws, thus easily pulling apart long hydraulic cylinders without stopping or resetting the attachment of the torque head apparatus 1100 with respect to the hydraulic cylinder.

The circular barrel 1102b of the rotating reel 1102 preferably also extends through the front guard plate 1114 and can include an outer rotating drum 1106 extending therefrom such that the outer rotating drum 1106 will rotate together with the rotating reel 1102. The outer rotating drum 1106 can include a plurality of holes 1106a extending therethrough in which a torque head tooling connector plate 1116 (aka: torque head tool connector plate) can be attached thereto with bolts. The torque head tooling connector plate 1116 is configured to retain different size and shape tooling pieces, which are configured to receive and securely fit different size nuts at the ends of different size hydraulic cylinders therein, as described in more detail below.

Figure 3I:
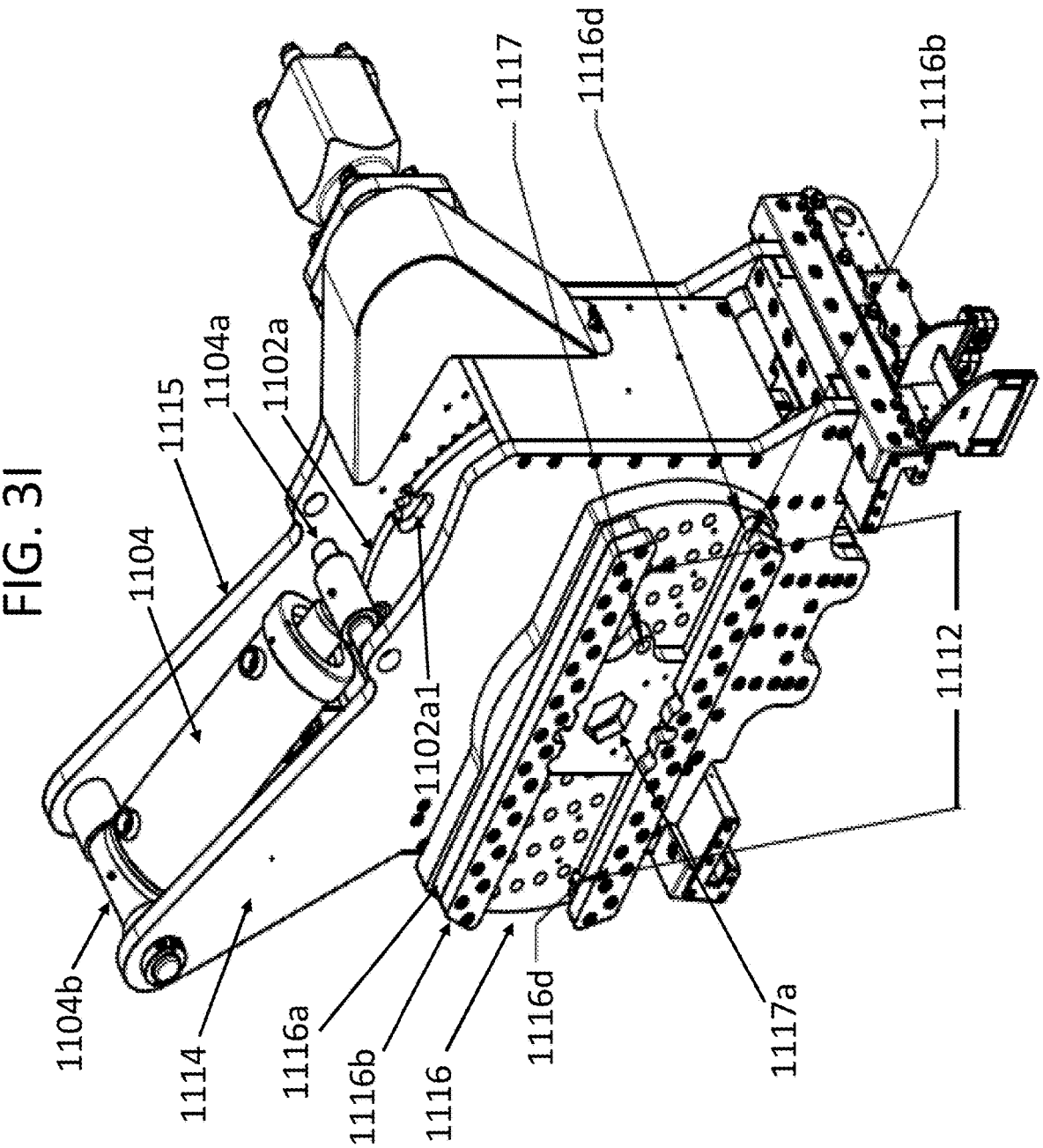
FIG. 3I illustrates a plan view of the torque head of FIGS. 3A and 3B with the torque head tool connector plate attached to thereto.
Figure 3J:
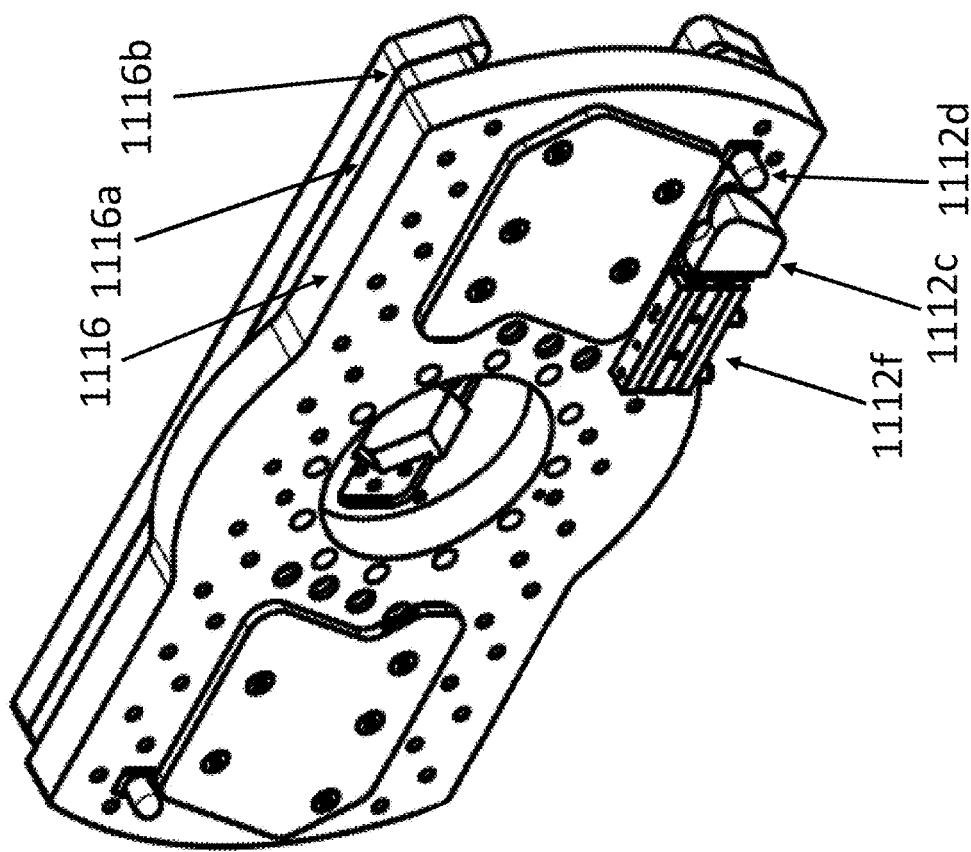
FIG. 3J illustrates a plan view of a torque head tool connector plate with a tool locking system attached to a back side thereof.
Figure 3K:
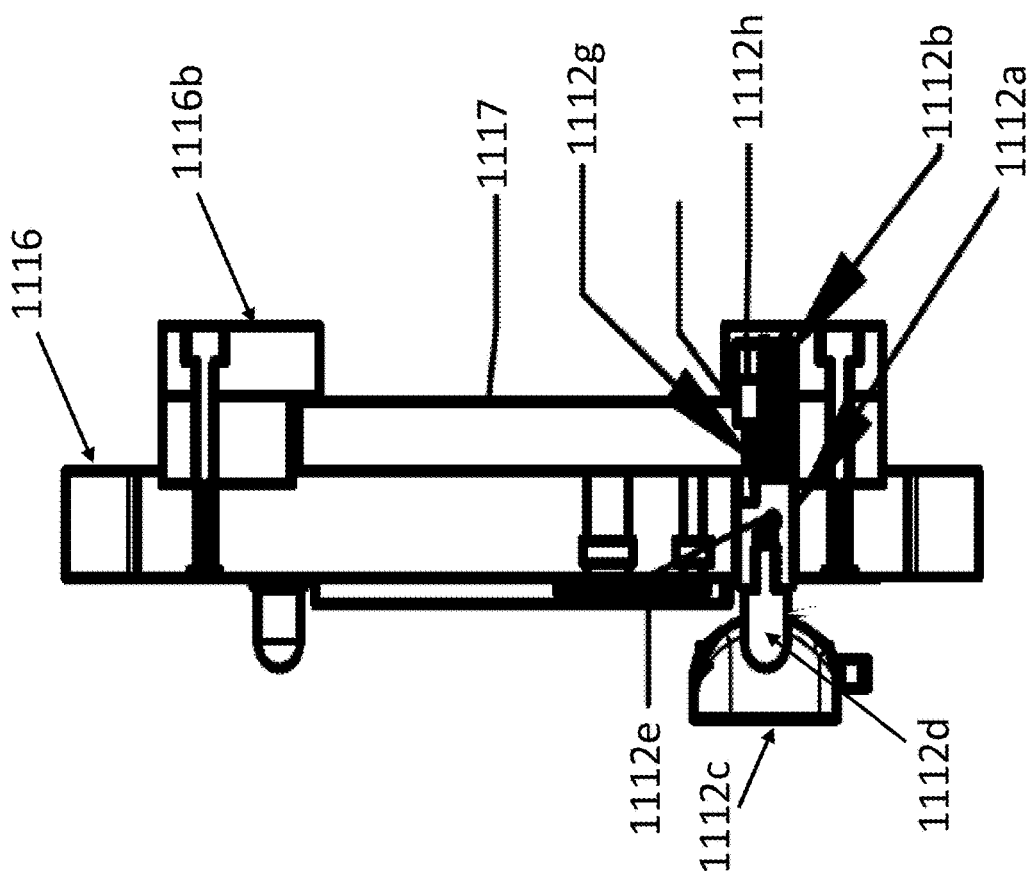
FIG. 3K illustrates a side view of the torque head tool connector plate illustrated in FIG. 3J.

Referring to FIGS. 3F and 3H-3I, the torque head tooling (or tool) connector plate 1116 can include a pair of parallel torque head tooling connector plate rails 1116a (see FIG. 3H) formed to extend along top and bottom portions thereof and a pair of corresponding parallel torque head tooling connector plate rail caps 1116b (see FIGS. 3G and 3H) fitted over the torque head tool connector plate rails 1116a. The torque head tooling connector plate rails 1116a are configured such that different shaped tooling pieces 1117 can be inserted therebetween while the torque head tooling connector plate rail caps 1116b retain the tooling pieces 1117 between the torque head tooling connector plate rails 1116a and against the torque head tooling connector plate 1116. The tooling pieces 1117 have different inner shapes in order to grab onto different shaped ends of a hydraulic cylinder. The tooling piece 1117 illustrated in FIG. 3I has a hexagonal inner shape in order to be securely inserted over a hexagonal nut threaded onto an end of a hydraulic cylinder intended to be threaded or unthreaded with respect to the hydraulic cylinder. The torque head tool connector plate rails 1116a can be welded to the torque head tooling connector plate 1116 and the torque head tool connector plate rail caps 1116b can be welded to the respective torque head tooling connector plate rail 1116a. Alternatively, the torque head tooling connector plate 1116, the torque head tooling connector plate rails 1116a and the torque head tooling connector plate rail caps 1116b can be formed of a single solid unit, such as steel, or any similar strong metal material that will withstand thousands of pounds of torque.

Each of the different shaped tooling pieces 1117 are preferably provided in two halves, where one half of a tooling piece 1117 can be inserted between the rails 1116a and caps 1116b at one end of the torque head tooling connector plate 1116 while a second half of the same tooling piece 1117 can be inserted between the rails 1116a and caps 1116b at an opposite end of the torque head tooling connector plate 1116 and slid along the rails 1116a until the two halves come into contact with each other. The two halves of the tooling piece 1117 being used, when inserted between the rails 1116a at opposite ends of the torque head tooling connector plate 1116, are then slid together between the rails 1116a. The two halves of each tooling piece 1117 can be shaped to form an opening 1117a therebetween when brought together, the opening 1117a being formed into the same shape and size as a nut at the head or the tail end of a hydraulic cylinder. Tooling pieces 1117 with different size and shape openings 1117a can be used for different size and shape nuts fastened to a hydraulic cylinder to be assembled or disassembled. Once the two halves of a tooling piece 1117 are set in place and ready to receive a nut either already threaded on a hydraulic cylinder or intended to be threaded thereon pegs or bolts can be inserted through the holes formed through the tooling pieces and corresponding holes 1116c formed through the torque head tooling connector plate 1116 to secure the tooling piece in place against the torque head tooling connector plate 1116.

While a nut at the head or tail end of a hydraulic cylinder will be inserted into the opening 1117a formed by the two halves of a tooling piece 1117 disposed within the torque head tooling connector plate 1116, a nut disposed at the other one of the head or tail end of the hydraulic cylinder can be similarly inserted within an opening formed by two halves of another tooling piece disposed at the tail stock 1200, as described in more detail below.

As illustrated in FIG. 3F, the torque head tooling connector plate 1116 can include a plurality of holes 1116c formed therethrough. These holes 1116c can be provided to align with holes formed through the tooling pieces 1117 such that the tooling pieces will be locked in place once slid to the desired position on the torque head tooling connector plate 1116. Accordingly, as the torque head tool connector plate 1116 rotates the tooling piece 1117 attached thereto will remain in place and will not slide with respect to the torque head tooling connector plate 1116.

FIGS. 3D, 3H and 3I illustrate a high torque cylinder 1104, according to an example embodiment of the present inventive concept. Referring to FIGS. 3D, 3H and 3I, since the nuts tightened to the head and/or tail end of a hydraulic cylinder are often very tightly secured onto a hydraulic cylinder, a high amount of torque is often required to loosen the nut before it can be rotated at higher speeds to disassemble the hydraulic cylinder. Similarly, when assembling a hydraulic cylinder, once a nut is threaded onto either the head or tail end thereof, a higher torque at low speed is generally required to tightly secure the nut onto the end of the hydraulic cylinder. Accordingly, a high torque cylinder 1104 can be disposed between the front guard plate 1114 and the rear guard plate 1115 to apply a slower speed and higher torque rotation to a nut of a hydraulic cylinder, as compared to the higher speed and lower torque provided by the high speed torque head motor 1103. The high torque cylinder 1104 can be operated via the electrical control panel 1300 (see FIGS. 2A and 2C), as well as being operated via a wireless remote control in communication with the electrical control panel 1300. The high torque cylinder 1104 can provide up to 60,000 ft-lbs of torque for loosening hydraulic cylinder nuts and 50,000 ft-lbs of torque for tightening hydraulic cylinder nuts. Further, a variable pressure control from 0 ft-lbs to the maximum amount of ft-lbs of torque can be provided by the high torque cylinder 1104.

Referring to FIGS. 3B, 3D and 3H-3I, the high torque cylinder 1104 can be pivotally secured between the front guard plate 1114 and the rear guard plate 1115 on a high torque cylinder pivot 1104b. The high torque cylinder 1104 can include a high torque cylinder rod 1104a which extends horizontally and is configured to drop into the reel notches 1102a1 formed along the outer circumference of the two circular reel plates 1102a. It is to be noted that the notches 1102a1 in the two circular reel plates 1102a should be configured to align with each other such that the high torque cylinder rod 1104a will rest in a notch 1102a1 in each of the two circular reel plates 1102a simultaneously.

Referring to FIGS. 3B and 3I, a lift cylinder 1105 can be provided to pivot the high torque cylinder 1104 about the pivot 1104b such that the high torque cylinder rod 1104a moves upward away from the two circular plates 1102a or downward toward the two circular plates 1102a, depending on whether a high torque rotation of the rotating reel 1102 is required. The lift cylinder 1105 (see FIG. 3D) can include a lift cylinder bracket 1105a to extend outward of the lift cylinder 1105 to lift the high torque cylinder 1104 away from the two circular plates 1102a (about the pivot 1104b) and to retract inward of the lift cylinder 1105 to move the high torque cylinder 1104 downward toward the two circular plates 1102a (about the pivot 1104b). At the end of the lift cylinder bracket 1105a can be provided a lift cylinder wheel 1105b to roll along an outer surface of the high torque cylinder 1104 to smoothly lift and lower the high torque cylinder 1104 (about the pivot 1104b). When the lift cylinder 1105 retracts inward the high torque cylinder 1104 drops downward toward the two circular plates 1102a until the high torque cylinder rod 1104a drops into the aligned pair of rotating reel notches 1102a1 formed in the two circular plates 1102a, as illustrated in FIG. 3D. At this point the high torque cylinder 1104 can be activated to slowly rotate the rotating reel 1102, which will simultaneously rotate the torque head connector plate 1116 and the tooling piece inserted between the torque head connector plate rails 1116a, which will in turn slowly rotate a nut tightly fastened to one end of a hydraulic cylinder when the nut is inserted within the opening formed between the two halves of the tooling piece.

Referring to FIGS. 3G, 3H, 3J, FIGS. 3K-3N and FIGS. 3O-3Q, the torque head apparatus 1100 can also include a tooling lock system 1112 to lock and release tooling pieces 1117 to and from the tool connector plate 1116. More specifically, a tooling lock system 1112 for the tooling pieces 1117 slid between the torque head tooling connector plate rails 1116a and torque head tooling connector plate caps 1116b of the torque head tooling connector plate 1116 can include a sliding lock key 1112a (see FIGS. 3H, 3K and 3N). The sliding lock key 1112a includes a section which protrudes into an area between the torque head tooling connector plate 1116 and the torque head tooling connector plate caps 1116c, which is the same area that the tooling pieces 1117 slide between. The sliding lock key 1112a also extends through a cutout 1116a1 formed in the torque head tooling connector plate rail 1116a.

In a relaxed state the sliding lock key 1112a is held in a position by a lock key spring 1112b to prevent tooling 1117 from sliding out from between the tooling connector plate rails 1116a, as will be described in more detail below. When an operator desires to remove a tooling piece 1117 from between the tooling connector plate rails 1116a the operator can rotate the torque head tool connector plate 1116 to a position slightly away from a horizontal position (see FIG. 3L), and then the operator can press and hold a tool release button 1118 (see FIG. 3Q), which activates an air cylinder 1112f. The air cylinder 1112f includes a lock key release ramp 1112c movably mounted thereto. By pressing the tool release button 1118 a solenoid (not illustrated) will become activated, which sends air pressure to the tool release ramp cylinder 1112f, causing the lock key release ramp 1112c to slide outward away from the air cylinder 1112f. The tool release button 1118 will also cause a magnetic sensor 1119 (see FIG. 3Q) to be activated. Using a remote control, which is wirelessly connected to the electrical control panel 1300, the torque head rotating reel 1102, and hence the torque head tool connector plate 1116, can be rotated until a notch 1120 on an outer end of the torque head rotating reel 1102 reaches the magnetic sensor 1119, at which point the torque head tool connector plate 1116 will be rotated to a horizontal position and come to a stop. This action will cause the lock key knob 1112d to come into contact with the lock key release ramp 1112c and slide the lock key knob 1112d along a side of the lock key release ramp 1112c, thus depressing the lock key knob 1112d and a lock key spring 1112b to retract the sliding lock key 1112a into the tool connector plate rail cap pocket 1116b1. A cut out 1112g (see FIG. 3N) in the lock key 1112a will then be aligned with the tool rail slide area 1116d to allow sliding removal of a tooling piece 1117. When an operator releases the tool release button 1118 the air supply to the tool release ramp cylinder 1112f will terminate and air will be supplied to a retract side of the air cylinder 1112f to retract the lock key release ramp 1112c. At this point the tool release ramp 1112c will remain held in place by interference of the lock key knob 1112d until the operator rotates the torque head rotating reel 1102 and the torque head tool connector plate 1116 enough such that the lock key knob 1112d disengages from the tool release ramp 1112c, at which point the tool release ramp 1112c will retract back to the air cylinder 1112f while the lock key spring 1112b drives the sliding lock key 1112a back such that the cut out 1112g will no longer be in alignment with the tool rail slide area 1116d and the sliding lock key 1112a will once again block the tooling slide area 1116d. A lock key retainer 1112e is provided on the sliding lock key 1112a to prevent the lock key spring 1112b from driving the slide lock key 1112a too far when in the relaxed state.

Figure 4C:
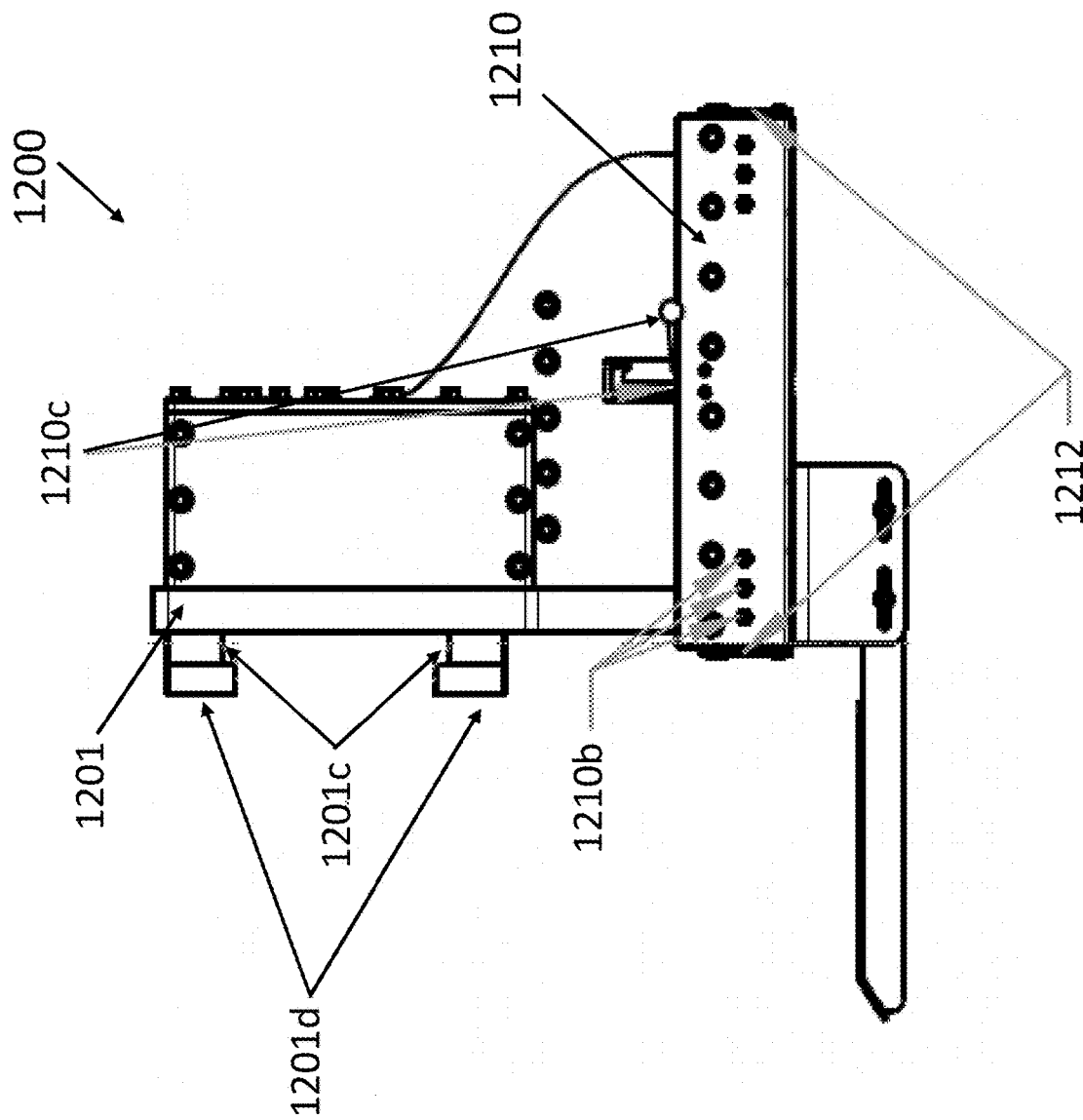
FIG. 4C illustrates a side view of the tail stock according to an example embodiment of FIG. 4A.

FIG. 4A illustrates a front view of a tail stock 1200 for the large scale hydraulic cylinder assembly, disassembly and maintenance system of FIG. 2A, according to an example embodiment of the present inventive concept, FIG. 4B illustrates a top view of the tail stock 1200 according to the example embodiment of FIG. 4A, and FIG. 4C illustrates a side view of the tail stock 1200 according to the example embodiment of FIG. 4A. The tail stock 1200 is preferably made from cast iron or a steel. However, the tail stock 1200 can be made from other materials that can withstand thousands of pounds of torque.

Referring to FIGS. 4A and 4C, the tail stock 1200 can include a tail stock tooling connector plate 1201 to receive a head or tail end of a hydraulic cylinder. The tail stock tooling connector plate 1201 can be formed from cast iron or steel. The tail stock tooling connector plate 1201 can include a plurality of holes 1201b formed therethrough to correspond with a plurality of holes formed through a tooling piece to be secured thereto. The tail stock tooling connector plate 1201 can also include a centrally positioned notch 1201a to allow objects to pass therethrough.

Still referring to FIGS. 4A and 4C, the tail stock tooling connector plate 1201 can also include tail stock tooling connector plate rails 1201c (see FIG. 4C) formed at top and bottom portions thereof to slidingly receive a tooling piece therebetween. Each of the tail stock tooling connector plate rails 1201c can include a tail stock tooling connector plate rail cap 1201d fixed to the respective tail stock tooling connector plate rail 1201c to secure a tooling piece between the tail stock tooling connector plate rails 1201c and against the front face of the tail stock tooling connector plate 1201. The tail stock tooling connector plate rails 1201c can be welded to the tail stock tooling connector plate 1201 and the tail stock tooling connector plate rail caps 1201d can be welded to the respective tail stock tooling connector plate rail 1201c. Alternatively, the tail stock tooling connector plate 1201, the tooling connector plate rails 1201c and the tail stock tooling connector plate rail caps 1201d can be formed of a single solid unit, such as a molded steel, or any similar strong metal material that will withstand thousands of pounds of torque.

Similar to the process described above with respect to the torque head 1110, once the two halves of a tooling piece are set in place between the tail stock tooling connector plate rails 1201c of the tail stock tooling connector plate 1201 and ready to receive a nut, threaded on a hydraulic cylinder, within the hole formed by the two halves of the tooling piece, a plurality of pegs or bolts can be inserted through the holes formed through the two halves of the tooling piece and corresponding holes 1201b formed through the tail stock tooling connector plate 1201 to secure the tooling piece in place against the tail stock tooling connector plate 1201.

Referring to FIGS. 4A and 4B, the tail stock 1200 is configured to slide along the guide rails 1012 that extend along the length of the cylinder pipe 1010 in the same way the torque head 110 slides along the guide rails 1012. More specifically, the tail stock 1200 can include a pair of rail guides 1210 and corresponding slide plates 1211 disposed at opposite ends of the bottom of the tail stock 1200 to correspond with the guide rails 1012, as illustrated in FIG. 4A. The rail guides 1210 are preferably formed of a steel, but can be formed of alternative metals which will perform the intended purposes as described herein. The pair of slide plates 1211 can be configured to be attached to the bottom of the tail stock 1200 and are preferably disposed in parallel with each other and spaced apart to rest on top of the corresponding guide rails 1012. The rail guides 1210 are configured to guide the tail stock 1200 to remain on the guide rails 1012 as the slide plates 1211 of the tail stock 1200 freely slide along the guide rails 1012. The rail guides 1210 can also each include a respective adjustable shim 1210*a* which can be adjusted by one or more adjustment screws 1210*b* to adjust the shim 1210*a* to move closer to the corresponding guide rail 1012 to ensure that the rail guides 1210 guide the tail stock 1200 in a straight path along the guide rails 1012. The slide plates 1211 and shims 1210*a* can be made of a plastic material which can easily slide across steel rails 1012. However, the slide plates 1211 and shims 1210*a* can be formed of other similar types of materials which will withstand the weight of the tail stock 1200 while enabling the tail stock 1200 to easily slide along the guide rails 1012 with little friction. Caps 1212 can be provided to retain the plastic shims 1210*a* within the rail guides 1210. The caps 1212 can be bolted or welded onto the rail guides 1210 of the tail stock 1200 to retain the shims 1210*a* in place within the rail guides 1210.

Referring to FIGS. 4A-4C, once the tail stock 1200 is manually slid to a desired position along the guide rails 1012 a tail stock lock pin 1210*c* disposed on each of the rail guides 1210 can be pivoted to a position in which they can drop through a hole in the rail guides 1210 and into a corresponding aligned rail hole 1012*a* formed in the guide rail 1012 to secure the tail stock 1200 in place along the guide rails 1012. For example, once a hydraulic cylinder is hoisted up in the air by the overhead crane 1024 and positioned directly above the cylinder pipe 101, and the torque head apparatus is moved along the guide rails 1012 to a position such that a nut at one of the head or tail end of the hydraulic cylinder is inserted into the corresponding tooling piece (shaped and sized for the nut on the hydraulic cylinder) and secured onto the torque head tool connector plate 1116, the tail stock 1200 can then be slid along the guide rails 1012 toward the torque head apparatus until a nut at the other end of the hydraulic cylinder is inserted into a corresponding tooling piece secured to the tail stock 1200. The tail stock lock pins 1210*c* can then be pivoted to a position where they will drop through the respective holes formed in the tail stock rail guides 1210 and into corresponding holes 1012*a* formed in the guide rails 1012. At this point a hydraulic cylinder to be assembled, disassembled or maintenance will be firmly secured between the torque head apparatus and the tail stock 1200 so that either the high speed torque head motor 1103 or the high torque cylinder 1104 can be operated to unthread or thread a nut off or onto the end of the hydraulic cylinder which is inserted into the tooling piece fixed to the torque head tool connector plate 1116.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hydraulic cylinder assembly, disassembly and maintenance system, comprising:
   an elongated cylindrical pipe having first and second ends and including:
      a pair of guide rails extending in parallel along a top portion thereof, and
      at least one ball screw extending between the pair of guide rails, the at least one ball screw including a sprocket attached to a first end thereof and disposed at the first end of the cylindrical pipe;
   a torque head assembly including:
      a pair of rail guides fixed to a bottom thereof to slide along a corresponding one of the pair of guide rails;
      a ball screw push bar disposed between the pair of rail guides, the ball screw push bar including at least one ball screw nut configured to threadedly receive the at least one corresponding ball screw therethrough to move the torque head assembly along the guide rails when the at least one ball screw is rotated;
      a rotating reel having notches around a circumferential surface thereof and a torque head tooling connector plate connected thereto which rotates together with the rotating reel, the torque head tooling connector plate being configured to receive any one of a first set of interchangeable tooling pieces thereon that each securely engage with a first end of a hydraulic cylinder to rotate the first end of the hydraulic cylinder;
      a rotation motor configured to rotate the rotating reel at a high speed and low torque; and
      a high torque cylinder configured to extend and retract to engage with the notches of the rotating reel to rotate the rotating reel at a lower speed and higher torque than the rotation motor; and
   a tail stock assembly including:
      a tail stock tooling connector plate having a pair of slide plates to slide along a corresponding one of the guide rails, the tail stock assembly configured to receive any one of a second set of interchangeable tooling pieces thereon to fixedly engage with a second end of the hydraulic cylinder.

2. The hydraulic cylinder assembly, disassembly and maintenance system according to claim 1, further comprising:
   a ball screw hydraulic motor disposed at the first end of the cylindrical pipe and having a sprocket to engage with and rotate the at least one ball screw.

3. The hydraulic cylinder assembly, disassembly and maintenance system according to claim 2, wherein the torque head assembly further comprises:
   a lift cylinder configured to lift the high torque cylinder away from the rotating wheel and to lower the high torque cylinder to engage with the rotating wheel when a high torque and low speed rotation of the rotating wheel is desired.

4. The hydraulic cylinder assembly, disassembly and maintenance system according to claim 2, further comprising:
   an electrical panel disposed at the first end of the cylindrical pipe to control power to the ball screw hydraulic motor, the rotation motor, the high torque cylinder and the lift cylinder.

5. The hydraulic cylinder assembly, disassembly and maintenance system according to claim 1, wherein the torque head assembly rail guides each comprise:
   a corresponding slide plate configured to rest on a respective guide rail; and
   an adjustable shim configured to be adjustable to maintain the rail guide in contact with a side of the respective guide rail.

6. The hydraulic cylinder assembly, disassembly and maintenance system according to claim 1, wherein the rotation motor is a torque head hydraulic motor.

7. A hydraulic cylinder assembly, disassembly and maintenance system, comprising:
   an elongated cylindrical pipe including a pair of guide rails extending in parallel along a top portion thereof;
   a torque head assembly including:
      a pair of rail guides fixed to a bottom thereof to slide along a corresponding one of the pair of guide rails;

a rotating reel having notches around a circumferential surface thereof and a torque head tooling connector plate connected thereto which rotates together with the rotating reel, the torque head tooling connector plate being configured to receive any one of a first set of interchangeable tooling pieces thereon that each securely engage with a first end of a hydraulic cylinder to rotate the first end of the hydraulic cylinder;

a first rotation motor configured to rotate the rotating reel at a high speed and low torque when a high speed and low torque rotation of the rotating reel is required; and a high torque cylinder configured to extend and retract to engage with the notches of the rotating reel to rotate the rotating reel at a lower speed and higher torque than the rotation motor when a lower speed and higher torque of the rotating reel is required; and a tail stock assembly including a pair of slide plates disposed at a bottom thereof to slide along a corresponding one of the guide rails, the tail stock assembly configured to receive any one of a second set of interchangeable tooling pieces thereon to fixedly engage with a second end of the hydraulic cylinder.

8. The hydraulic cylinder assembly, disassembly and maintenance system according to claim 7, wherein:

the cylindrical pipe further includes:
- at least one ball screw rotatably extending between the pair of guide rails; and
- a second rotational motor connected to a first end of the at least one ball screw and disposed at the first end of the cylindrical pipe; and the torque head assembly further includes a ball screw push bar disposed between the pair of rail guides, the ball screw push bar including at least one threaded hole to receive the at least one corresponding ball screw to engagingly move the torque head assembly along the guide rails when the second rotational motor rotates the at least one ball screw.

\* \* \* \* \*